(12) United States Patent
Guest et al.

(10) Patent No.: US 10,253,836 B2
(45) Date of Patent: Apr. 9, 2019

(54) THREE DIMENSIONAL LATTICE WEAVES WITH TAILORED DAMPING PROPERTIES

(71) Applicant: THE JOHNS HOPKINS UNIVERSITY, Baltimore, MD (US)

(72) Inventors: James K. Guest, Lutherville, MD (US); Kevin J. Hemker, Reisterstown, MD (US); Timothy P. Weihs, Baltimore, MD (US); Stephen M. Ryan, Towson, MD (US); Stefan Szyniszewski, Surrey (GB)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 15/088,979

(22) Filed: Apr. 1, 2016

(65) Prior Publication Data

US 2017/0023084 A1    Jan. 26, 2017

Related U.S. Application Data

(60) Provisional application No. 62/141,556, filed on Apr. 1, 2015.

(51) Int. Cl.
*F16F 7/00* (2006.01)
*F16F 7/10* (2006.01)
(Continued)

(52) U.S. Cl.
CPC .............. *F16F 7/00* (2013.01); *D03D 25/005* (2013.01); *F16F 1/37* (2013.01); *F16F 7/08* (2013.01);
(Continued)

(58) Field of Classification Search
CPC .... F16F 7/00; F16F 7/1028; F16F 7/08; F16F 2224/0208; F16F 2224/0275;
(Continued)

(56) References Cited

U.S. PATENT DOCUMENTS

| | | | |
|---|---|---|---|
| 2010/0140439 A1* | 6/2010 | Schuh | C22C 9/00 248/562 |
| 2014/0220845 A1* | 8/2014 | Elder | B32B 5/08 442/198 |

OTHER PUBLICATIONS

Banhart et al., Adv. Eng. Mater. 10 Aluminium FoamSandwich Panels: Manufacture, Metallurgy and Applications. (2008) 793.
(Continued)

*Primary Examiner* — Vishal R Sahni
(74) *Attorney, Agent, or Firm* — Johns Hopkins Technology Ventures

(57) ABSTRACT

The present invention is directed to three dimensional weaves composed of wires or yarns that offer the potential for damping not achievable with solid materials, including high temperature damping. Three damping mechanisms have been identified: (1) Internal material damping, (2) Frictional energy dissipation (Coulomb damping), and (3) inertial damping (tuned mass damping). These three damping mechanisms can be optimized by modifying the wire material chemistries (metals, ceramics, polymers, etc.), wire sizes, wire shapes, wire coatings, wire bonding, and wire architecture (by removing certain wires). These have the effect of modifying the lattice and wire stiffnesses, masses, coefficients of friction, and internal material damping. Different materials can be used at different locations in the woven lattice. These design variables can also be modified to tailor mechanical stiffness and strength of the lattice, in addition to damping.

22 Claims, 20 Drawing Sheets

(51) Int. Cl.
*F16F 7/08* (2006.01)
*D03D 25/00* (2006.01)
*F16F 1/37* (2006.01)

(52) U.S. Cl.
CPC ........ *F16F 7/1028* (2013.01); *D10B 2101/08* (2013.01); *D10B 2101/20* (2013.01); *F16F 2222/02* (2013.01); *F16F 2224/02* (2013.01); *F16F 2224/0208* (2013.01); *F16F 2224/0275* (2013.01); *F16F 2224/0291* (2013.01); *F16F 2226/04* (2013.01); *F16F 2234/06* (2013.01)

(58) Field of Classification Search
CPC ........... F16F 2224/0291; F16F 2224/02; F16F 2226/04; F16F 2234/06; D03D 1/0035
See application file for complete search history.

(56) References Cited

OTHER PUBLICATIONS

Brothers et al., Scr. Mater. 52 Processing and structure of open-celled amorphous metal foams (2005) 335.

Challis et al., Computationally generated cross-property bounds for stiffness and fluid permeability using topology optimization, Int. J. Solids Struct. 49 (2012) 3397.

Childs et al. The Space Shuttle Main Engine High-Pressure Fuel Turbopump Rotordynamic Instability Problem1. J. Eng. Gas Turbines Power 100 (1978) 48.

Chu et al., The kinetics of the reduction of chromium oxide by hydrogen. Trans. B10 (1979) 401.

Dharmasena et al,Dynamic compression of metallic sandwich structures during planar impulsive loading in water. Eur. J. Mech.—ASolids 29 (2010) 56.

Douglass et al., The Oxidation Mechanism of Dilute Ni—Cr Alloys. Corros. Sci. 8 (1968) 665.

Ertas, et al. Nonlinear Dynamic Characterization of Oil-Free Wire Mesh Dampers. Eng. Gas Turbines Power 130 (2008) 032503.

Ertas, et al. Dynamic Characteristics of Shape Memory Alloy Metal Mesh Dampers, in: American Institute of Aeronautics and Astronautics. 50th AIAA/ASME/ASCE/AHS/ASC Structures, Structural Dynamics, and Materials Conference. May 4-7, 2009, Palm Springs, California.

Guest, et al., Optimizing multifunctional materials: Design of microstructures for maximized stiffness and fluid permeability. Int. J. Solids Struct. 43 (2006) 7028.

Guilemany, et al. Role of heat treatments in the improvement of the sliding wear properties of Cr3C2—NiCr coatings. Surf. Coat. Technol. 157 (2002) 207.

Jones, Results of a Round Robin Test Program: Complex Modulus Properties of a Polymeric Damping Material (Wright Lab, Wright-Patterson AFB OH, May 1992), ADA263619.

Liu et al., Experimental and Analytical Estimation of Damping in Beams and Plates with Damping Treatments, University of Kansas, 2008.

Maloney, et al., Multifunctional heat exchangers derived from three-dimensional micro-lattice structures. Int. J. Heat Mass Transf. 55 (2012) 2486.

Moradi, et al., Computational evaluation of limit states of thin-walled channels made from steel foam.Thin-Walled Struct. 62 (2013) 206.

Ouyang, et al., Friction and wear properties of hot-pressed NiCr BaCr2O4 high temperature self-lubricating composites Wear 301 (2013) 820.

Schaedler, et al., Ultralight Metallic Microlattices. Science 334 (2011) 962.

Sharp, et al., Metallic cellular materials produced by 3D weaving. in:, Procedia Mater. Sci. 4,2014, pp. 15-20.

Stott, et al., The Mechanism of Oxidation of Ni—Cr—Al Alloys AT 1000°-1200° C. Corros. Sci. 11 (1971) 799.

Sypeck, et al. Multifunctional microtruss laminates: Textile synthesis and properties. J. Mater. Res. 16 (2001) 890.

Szyniszewski et al., in:, 2009 Stud. Congr.—Dont Mess Struct. Eng. Expand. Our Role Apr. 30 2009-May 2, 2009, American Society of Civil Engineers, Austin, TX, United states, 2009, pp. 1259-1268.

Szyniszewski et al., Energy flow in progressive collapse of steel framed buildings. T. Krauthammer, Eng. Struct. 42 (2012) 142.

Szynisewski et al., Local buckling strength of steel foam sandwich panels. Thin-Walled Struct. 59 (2012) 11.

Szynisewski et al., The mechanical properties and modeling of a sintered hollow sphere steel foam. Des. 54 (2014) 1083.

Wadley, et al., An active concept for limiting injuries caused by air blasts. Int. J. Impact Eng. 37 (2010) 317.

Yungwirth et al., Impact response of sandwich plates with a pyramidal lattice core. Int. J. Impact Eng. 35 (2008) 920.

Zhou, et al., The low velocity impact response of foam-based sandwich panels. Compos. Sci. Technol. 72 (2012) 1781.

Zhao, et al., Permeability measurements and modeling of topology-optimized metallic 3-D woven lattices. Acta Mater. 81 (2014) 326.

\* cited by examiner

THREE DIMENSIONAL LATTICE WEAVES WITH TAILORED DAMPING PROPERTIES

CROSS REFERENCE TO RELATED APPLICATIONS

This application claims the benefit of U.S. Provisional Patent Application No. 62/141,556 filed Apr. 1, 2015, which is incorporated by reference herein, in its entirety.

GOVERNMENT RIGHTS

This invention was made with government support under W91CRB1010004 awarded by the Defense Advanced Research Projects Agency. The government has certain rights in the invention.

FIELD OF THE INVENTION

The present invention relates generally to damping. More particularly the present invention relates to a three dimensional lattice weave with tailored damping properties.

BACKGROUND OF THE INVENTION

Research on metal foams has demonstrated the potential of porous metals to enhance mechanical characteristics, such as energy dissipation, buckling mitigation, and bending rigidity (especially for sandwich panels). The random pore structure of metallic foams is contrasted with micro-architected materials, which have been introduced as highly efficient materials with increased promise in multifunctional applications due to their controlled pore structure.

Vibrations that occur within high speed rotary devices, such as turbines, can lead to excessive wear and fatigue, and measures to reduce vibrations within these components hold significant interest. Dissipation of vibrational kinetic energy under dynamic loading is essential for the attenuation of unwanted vibrations and oscillations that can lead to premature failure. Although polymeric materials typically offer excellent damping properties, they are not feasible in high temperature environments and there is a need for non-polymeric materials that can dampen vibrations at high operating temperatures without the use of a damping fluid.

Randomly oriented, metallic wire mesh dampers were initially developed for use in the space shuttle main engine high-pressure fuel turbo pump. The rotodynamic instability of the rocket engine turbopump, characterized by large and damaging subsynchronous whirling motions, was mitigated with a wire mesh mechanical damper that offered improved stability by reducing the reaction forces on the supports. More recently, General Electric (GE) developed oil-free dampers for applications in turbomachinery. A knitted mesh of interlocking loops of copper wires was compressed into a toroidal shape with 25% mesh density and employed as a bearing support damper that depended on the excitation frequency. However, these mesh solutions were randomly formed and therefore not engineered for optimal damping.

It would therefore be advantageous to provide a custom designed mesh for providing increased damping properties, including (but not limited to) increased damping in a high temperature environment.

BRIEF DESCRIPTION OF THE FIGURES

FIG. 10A: Unit cell design element mesh underlying the optimized solution: the lines indicate that warp, fill, and Z-wires are to be projected ($\phi$=1), respectively, and grey lines indicate no wire projection occurs ($\phi$=0); FIG. 10B: the continuum representation $\rho^e$ of (a) following the projection operation; and FIG. 10C a cutaway view showing streamlines associated with flow in the warp direction.

FIG. 11A: sample as woven but not bonded, FIG. 11B: thin sheet of braze on 3.4 cm×1.3 cm surface, FIG. 11C surface after heating and bonding, FIG. 11D fill-z cross-section of standard architecture showing bonded wire junctions, FIG. 11E fill-z cross-section of optimized architecture showing bonded wires. Wires are 202 micron in diameter.

FIG. 15A illustrates the projected object. FIG. 15B illustrates phase mixing occurs when objects become too close, requiring penalization. FIG. 15C illustrates optimized layout of stiff inclusions in periodic material for maximized isotropic bulk modulus. This approach is extended here to prevent overlapping wires in 3D woven lattices.

SUMMARY

Figures 1A, 1B, 1C:
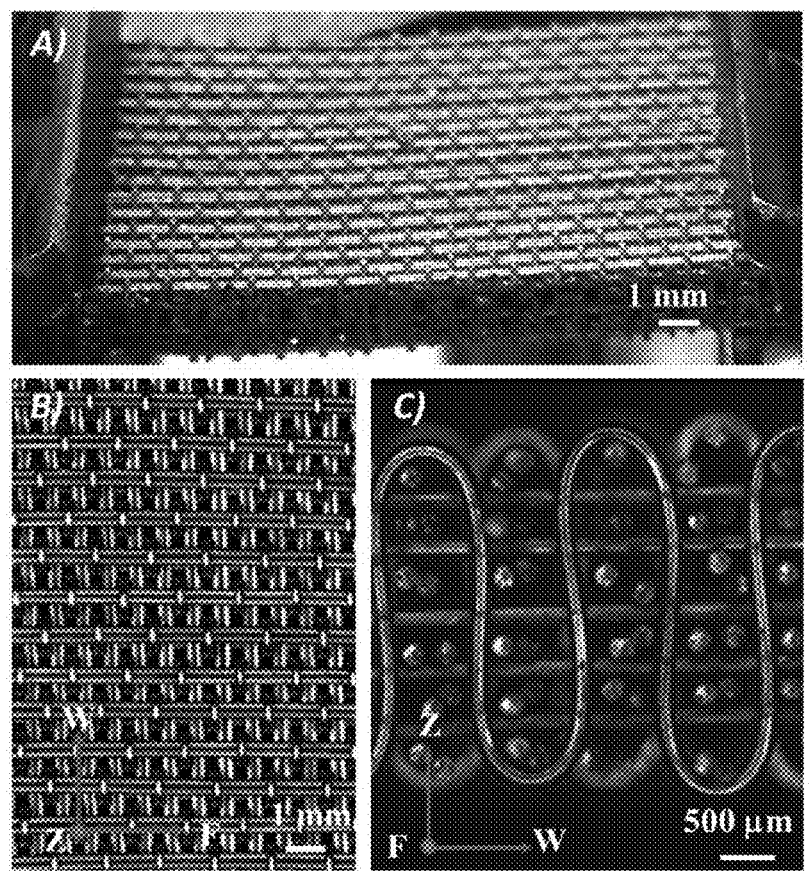
FIG. 1A illustrates a perspective view of a metallic 3D woven sample clamped in the DMA.
FIG. 1B illustrates a top down view of the lattice material.
FIG. 1C illustrates a side view of the standard material exhibiting gaps between many of the wires. W, F, and Z represent the warp, fill, and Z directions respectively.

The foregoing needs are met, to a great extent, by the present invention, wherein in one aspect a device for providing damping includes wires woven to create a damping material. Positions of the wires in the damping material are selected to enhance damping.

In accordance with an aspect of the present invention, the wires are formed from one selected from a group of metal, ceramic, and polymer. The wires are formed from one selected from a group of NiCr and Cu. The wires are formed from a combination of metals, ceramics, and/or polymers. The wires are formed from a silica, alumina, or carbon based material. The wires are woven in x, y, and z directions. The damping material is configured for damping due to at least one method selected from a group of internal material damping, frictional energy dissipation (Coulomb damping), and inertial damping (tuned-mass damping). Damping can be achieved by by modifying wire material chemistry, wire size, wire shape, wire coating, wire bonding, and wire architecture. The wires can take the form of a yarn. The positions of the wires to form the damping material are chosen by one selected from a group of topology optimization, intuition motivated architectures, and mechanical-based design.

In accordance with another aspect of the present invention, a method for forming a damping material includes weaving wires in x, y, and z directions to form the damping material. The method also includes selecting positions of the wires to provide damping.

In accordance with still another aspect of the present invention, the method includes configuring the damping material for damping due to at least one method selected from a group of internal material damping, frictional energy dissipation (Coulomb damping), and inertial damping (tuned-mass damping). Optimizing of damping can be achieved by modifying one selected from a group consisting of wire material chemistry, wire size, wire coating, wire shape, wire bonding, wire architecture. The method includes using wires taking the form of yarns. The position of the wires can be selected from a group of topology optimization, intuitive architecture, and mechanical-based design. Topology optimization can be executed using a non-transitory computer readable medium. Optimization can be performed during manufacture in real-time. It can also take into account the constraints of the manufacturing process.

DETAILED DESCRIPTION OF THE PREFERRED EMBODIMENTS

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

The present invention is directed to three-dimensional weaves composed of metallic or polymer or ceramic wires or yarns that offer the potential for high temperature damping not achievable with solid materials. Three damping mechanisms have been identified: (1) Internal material damping, (2) Frictional energy dissipation (Coulomb damping), and (3) inertial damping (tuned mass damping). These three damping mechanisms can be optimized by modifying the wire material chemistries (metals (elements or alloys), polymers, ceramics, etc.), wire sizes, wire coatings, wire shapes, wire bonding, and wire architecture (by removing certain wires). These have the effect of modifying the lattice architecture and wire stiffnesses, masses, coefficients of friction, and internal material damping properties. Different materials can be used at different locations in the woven lattice. These design variables can also be modified to tailor mechanical stiffness and strength of the lattice, in addition to damping. Three-dimensional (3D) weaving of metallic or polymer or ceramic wires or yarns provides an efficient and cost effective means of creating meaningful volumes of metallic micro-architected "lattice materials". The pore structure may be tailored by designing the wire architecture to optimize damping and wires may be bonded to create stiff micro-lattices. Topology optimization, intuitive architecture, and mechanical-based design are used to inform the placement of the wires or yarns in the mesh.

The present invention includes micro-architected metallic or polymer or ceramic lattice materials manufactured through a non-crimp 3D weaving technique. As examples the lattice materials can be made from 202 μm diameter wires of either OFHC Cu (oxygen free high conductivity copper) or Chromel-A (a NiCr alloy of 80% nickel and 20% chromium), as illustrated in FIGS. 1A-1C. FIG. 1A illustrates a perspective view of a metallic 3D woven sample clamped in the DMA. FIG. 1 B illustrates a top down view of the lattice material. FIG. 1C illustrates a side view of the standard material exhibiting gaps between many of the wires. W, F, and Z represent the warp, fill, and Z directions respectively.

Figure 2:
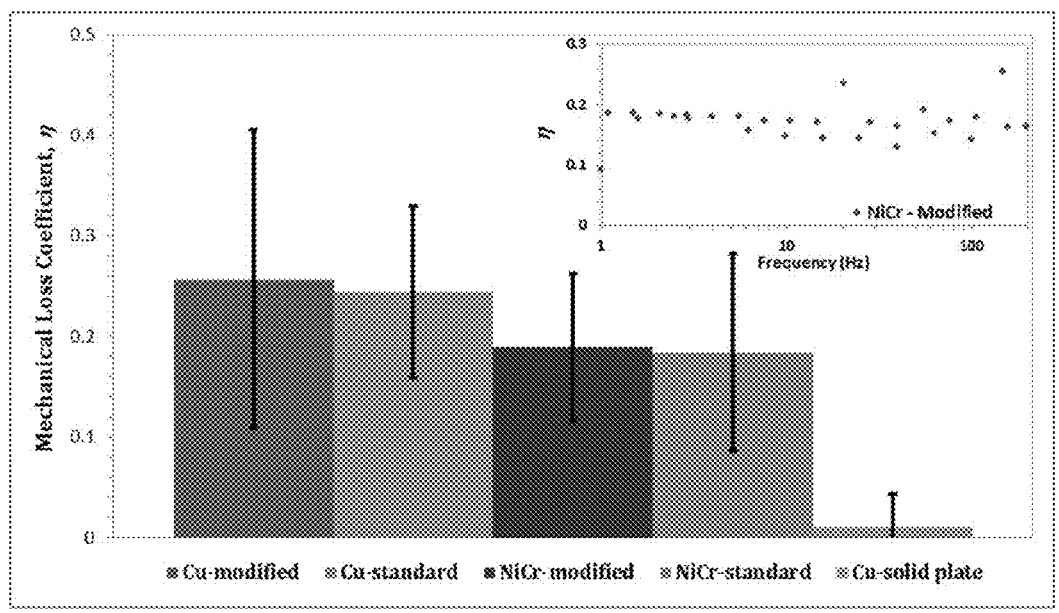
FIG. 2 illustrates a graphical view of averaged experimental loss coefficients, $\eta$ (damping) of the 3D woven metallic lattice materials. The inset illustrates a graphical view that the loss factor for the NiCr-modified architectured material did not depend on frequency for the experimentally tested frequency range, and is representative of all of the samples.
Figure 3:
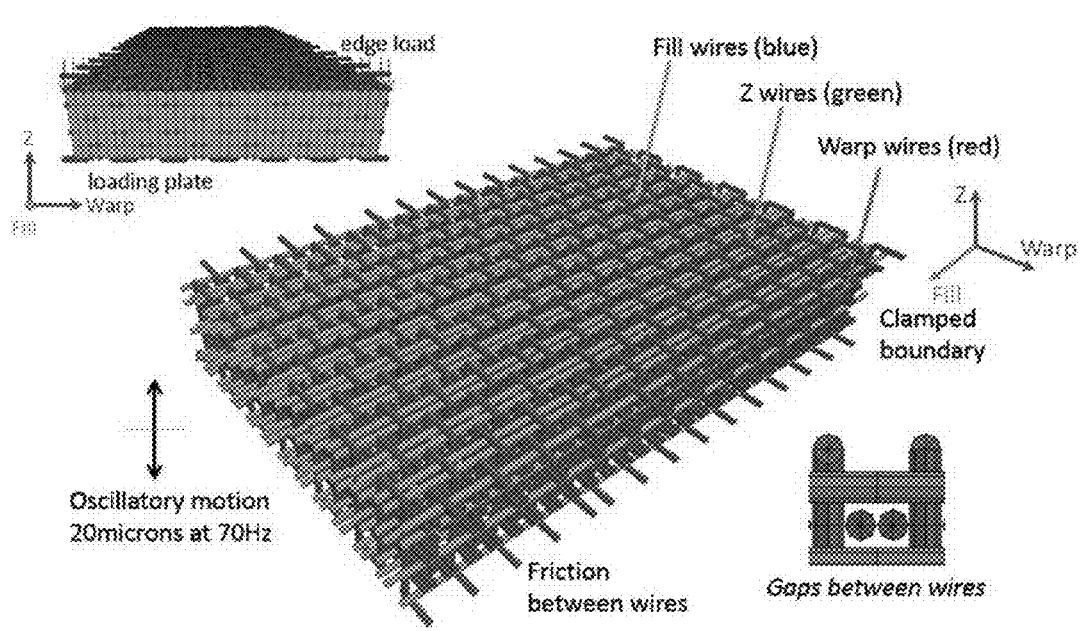
FIG. 3 illustrates a schematic diagram of a simulation of the 3D woven metallic sample (clamped at far end, and subjected to oscillatory excitation at the near end). The model employs frictional contact. The modified weave architecture is shown with fill wires shaded blue, the warp wires shaded red, and the z-wires shaded green.

The 3D weaving process essentially stacks pairs of orthogonally oriented warp and fill wires, which are then bound in process, with Z-wires that pass through the thickness, as illustrated in FIGS. 1A-1C and FIG. 2. FIG. 2 illustrates a graphical view of averaged experimental loss coefficients, η (damping) of the 3D woven metallic lattice materials. The inset illustrates a graphical view that the loss factor for the NiCr-modified architectured material did not depend on frequency and is representative of all of the samples. Two different architectures are presented for the present invention. These architectures are merely examples and are not meant to be considered limiting. The first architecture has wires placed in all candidate locations within the fiber architecture and is referred to as the 'standard' weave. The second, lower density architecture selectively leaves some locations with the fiber architecture unfilled, and is referred to as a 'modified' weave. Topology optimization for fluid permeability and in plane shear stiffness informed the choice of which positions to leave unfilled. Images of the 'standard' and 'modified' weaves are shown in FIGS. 1 and 3, respectively. The damping properties of these materials were measured over a range of frequencies, from 1 Hz to 200 Hz.

The ratio of the loss modulus $k_s''$ to the storage modulus $k_s'$ was employed for damping quantification. This ratio is equivalent to the tangent of the phase lag, $\phi$, between the force and displacement oscillations in the idealized spring and dashpot system, and it is referred to as the loss coefficient:

$$\eta = \tan\phi = \frac{k_s''}{k_s'} \quad (1)$$

Loss and storage modulus were measured using a TA Instruments Q800 Dynamic Mechanical Analyzer (DMA) and were calculated from LS-DYNA simulation results as:

$$k_s' = \frac{P_a'}{X_a} \quad (2)$$

$$k_s'' = \frac{P_a''}{X_a} \quad (3)$$

where $x_a$ is the displacement amplitude (maximum displacement), $P_a'$ is the force at the peak displacement (in-phase reaction), and $P_a''$ is the force at the zero displacement (out-of-phase reaction). The loss coefficient can be approximated to other damping measures for single degree of freedom systems as follows:

$$\eta = \frac{\Delta U}{2\pi U_{max}} = 2\zeta\sqrt{1-\zeta^2} \quad (4)$$

where $\Delta U$ is the dissipated energy per cycle, $U_{max}$ is the elastic energy at peak force, and $\zeta$ is the critical damping ratio. The loss coefficient, η was experimentally measured with the DMA in order to characterize the overall damping properties of the material. Computational simulations were then employed to investigate the damping mechanisms, specifically Coulomb (frictional) damping and inertial damping, in order to estimate their relative contributions to the loss coefficient. The frictional energy dissipation mechanism is attributed to wire on wire sliding. The inertial damping mechanism is envisaged to result from out of phase wire movements in the weave, and includes energy dissipation through collision of wires.

Samples for these dynamic tests were prepared by wire electrical discharge machining (EDM) from the bulk 3D weaves in order to minimize damage caused by the cutting process. Samples were cut to widths of 10 and 15 mm and a minimum length of 25 mm. The unsupported length was 17.5 mm, and the remainder of the material was clamped at each end in the DMA, as illustrated in FIGS. 1A-1C. The grips were tightened with one bolt per grip by applying 0.3 N-m torque. One of the clamps was then subjected to a sinusoidal oscillation with amplitude of 20 μm and with frequency varied from 1 to 200 Hz. The amplitude was chosen to keep the internal wire stresses below their yield stress.

Ten different woven samples were tested over a range of 1 to 200 Hz. Each sample was tested in four different orientations by flipping and rotating the samples between tests to ensure repeatability, resulting in greater than 40 measurements. No systematic frequency dependence of the loss coefficient was observed as illustrated in the insert in FIG. 2, and the measurements were averaged for each frequency. The compilation of experimental data presented in FIG. 2 indicates that the measured damping loss coefficients of these woven lattices are an order of magnitude greater than for a solid sample of the same material. The loss coefficients ranged from 0.24 to 0.26 for the Cu lattices and from 0.18 to 0.19 for the NiCr lattices, which were all significantly greater than the value of 0.01±0.03 that was measured for solid Cu and literature values of 0.001 for solid NiCr. The standard deviation of the measurements of the woven materials ranged from 0.07 to 0.15. It is believed that this is attributed to the fact that it is difficult to clamp each sample in the exact same position between each frequency sweep.

Dynamic tests of NiCr-modified architecture weaves were simulated using LS-DYNA software in order to elucidate the energy dissipation mechanisms. A model with the dimensions of 10×17.5 mm (matching the size of the DMA experimental samples) was generated with all wires explicitly included, as illustrated in FIG. 3. FIG. 3 illustrates a schematic diagram of a simulation of the 3D woven metallic sample (clamped at far end, and subjected to oscillatory excitation at the near end). The model employs frictional contact. The modified weave architecture is shown with fill wires shaded blue, the warp wires shaded red, and the z-wires shaded green. Optical characterization of the manufactured samples revealed gaps between the wires, as illustrated in FIG. 1C and therefore multiple permutations of the wire positions were considered. These included: (i) a tightly-packed, 'perfect' model where all wires are tangent and there are no unintended gaps between wire junctions, referred to as the zero-gap model; and (ii) a model featuring gaps in between all wires where the vertical gaps were varied, as illustrated in FIG. 3. Although the distribution of gaps in the manufactured sample is stochastic, as seen in FIG. 1C, a simplification is made herein to assume uniform gap sizes in each direction that are based on optical measurements of real samples. The mean spacing values from the optical measurements that were employed in the model were 99 μm in the warp direction, 10 μm in fill direction, and 47 μm vertical (z-direction) gaps between warp and fill wire pairs, shown to scale in FIG. 3 for the modified weave architecture. While neither of these models is exactly representative of a manufactured sample, since all simulated wires are perfectly straight and free of residual stresses, the models provide insight into the damping mechanisms at play in the 3D woven materials.

The nodes on one end were fully clamped in order to achieve a fixed boundary and an oscillatory force load was imposed on the opposite end with a virtually massless vertical elastic shell. The mass of the loading plate was less than 0.1% of the specimen's mass in order to ensure that its inertia did not affect the simulation results. A sinusoidal load at 70 Hz was applied to the top of the loading plate, such that oscillatory displacements of 20 μm were achieved. An explicit solver was used for all simulations, with contact and friction between wires captured through the use of the general contact algorithm. A very small time step of 8.4 ns was used to track contact points, and beam elements representing the wires were fully integrated. A static coefficient of friction $f_s=0.44$ and dynamic coefficient of friction $f_d=0.2$ was employed in the simulations. The ratio of dynamic to static coefficient of friction is consistent with the ratios given for other metallic materials. To match observations from dynamic friction tests for other metallic materials such as mild steel, the transition from static to dynamic coefficient of friction was modeled using an exponential decay function that decays to the dynamic coefficient of friction for contact sliding velocities larger than 25 mm/s. The elastic modulus of NiCr was estimated to be E=130 GPa from initial elastic loading during tensile tests of a single NiCr wire. Results of the dynamic analysis were then used with equations (1)-(3) to estimate the loss coefficient. Internal damping of the NiCr material was not considered in the model as it is negligible compared to the observed loss coefficients in the materials.

Simulations of the NiCr modified architecture lattice predicted absolute loss coefficients with magnitudes that were the right order of magnitude, though only about half of the experimental values. The fact that the simulations captured the more than 10× increase over bulk samples is encouraging and the observation that the simulated losses are systematically lower than the measured values points to the influence of stochastic irregularities in the underlying architecture on the dynamic response. The computational model illustrated in FIG. 3 uses idealized geometries of the wires (all warp and fill wires were straight, and Z-wires had 90° bends), while FIGS. 1A-1C show that wires were not perfectly straight and were often in contact with other wires, despite the gaps between wires. The models with idealized geometries were nevertheless useful for a preliminary study of the sensitivity of the damping loss coefficient on two key parameters: coefficient of friction and average gap size.

The effect of the coefficient of friction on damping was found to be dependent on the assumed gap sizes. As is illustrated in Table 1, doubling the coefficient of friction increased the simulated loss coefficient by one third for both the zero-gap model, and 10% when gaps were only incorporated in the warp and fill directions. By contrast, simulations that included gaps in all three directions showed no appreciable change in the simulated loss coefficient when the friction coefficient was doubled. Intuitively this result indicates that friction-based damping is activated in tightly packed lattices, while inertial-based damping is always present but likewise dependent on gap sizes. It is worth noting that the coefficient of friction for Cu ($f_s^{Cu}=1.1$) is larger than that of NiCr ($f_s^{NiCr}=0.44$) and that the measured loss coefficients for the Cu lattices were consistently and significantly higher than for the NiCr lattices. This suggests that even with inherent manufacturing irregularities, damping of woven lattice materials is influenced by friction.

TABLE 1

Sensitivity of the simulated loss coefficient to wire spacing and the coefficient of friction in the 3D woven modified architecture lattice of NiCr.

| | Gaps | | |
|---|---|---|---|
| | No gaps | Horizontal gaps only | Average measured gaps |
| Simulated gap spacings (microns) | warp = 0 fill = 0 z = 0 | warp = 99 fill = 10 z = 0 | warp = 99 fill = 10 z = 47 |
| Measured coefficient of friction ($f_s = 0.44$, $f_d = 0.20$) | 0.15 | 0.13 | 0.06 |
| Increased coefficient of friction ($f_s = 0.88$, $f_d = 0.40$) | 0.19 | 0.14 | 0.06 |
| Comments | Sensitive to friction | Minor friction effect | Negligible friction effect |

Changes in the mean gaps sizes were further investigated and found to have a negligible effect on the simulated loss coefficient. A model using mean gap sizes similar to those present in the experimental samples exhibited a simulated loss coefficient of 0.06. Doubling the z-direction gaps (from 47 to 94 microns) decreased the simulated loss coefficient from 0.06 to 0.05. Halving the z-direction gaps (from 47 to 23.5 microns) also decreased the simulated loss coefficient from 0.06 to 0.05. The variations between simulated loss coefficients indicated that within the considered loading frequency range the inertial damping is not particularly sensitive to uniformly distributed (non-stochastic) gaps sizes, as long as there is sufficient space for the wire movement to occur.

Figure 4:
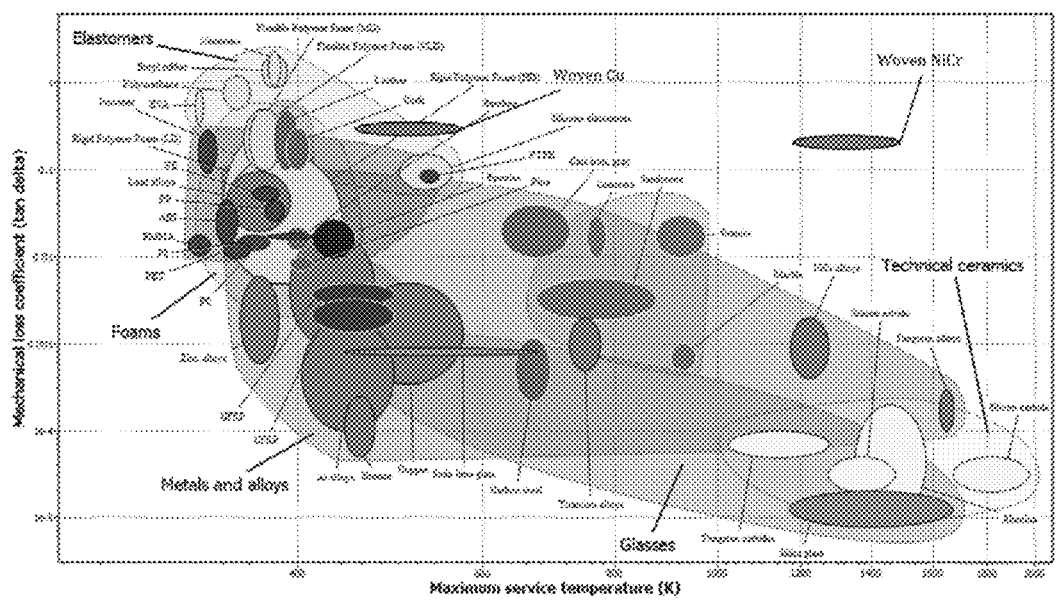
FIG. 4 illustrates a graphical view of a property correlation plot of the mechanical loss factor, $\eta$ and the maximum service temperature for a wide variety of materials and material classes. The measured damping performance of 3D woven NiCr lattice materials combined with the maximum service temperature of NiCr highlight its potential for use in elevated temperature damping environments. Note that the woven materials were all measured in bending. The reference values may have been obtained with different loading conditions.

The experimental results (FIG. 2) clearly demonstrate that 3D woven metallic lattice materials hold promise as damping materials. The majority of conventional damping materials with comparable loss coefficients, such as polymers, are restricted to significantly lower temperatures, whereas the NiCr wires have a maximum service temperature of 1175° C. A property correlation plot of the damping properties measured in this work with the maximum service temperatures of the wires is shown in FIG. 4. FIG. 4 illustrates a graphical view of a property correlation plot of the mechanical loss factor, η and the maximum service temperature for a wide variety of materials and material classes. The measured damping performance of 3D woven NiCr lattice materials combined with the maximum service temperature of NiCr highlight its potential for use in elevated temperature damping environments. Note that the woven materials were all measured in bending. The reference values may have been obtained with different loading conditions. If the damping properties are maintained at the maximum service temperatures, 3D woven metallic lattice materials would offer the damping properties of polymers at temperatures in which only high temperature metallic and technical ceramics are applicable.

It is worth noting that NiCr wires also exhibit excellent high temperature corrosion resistance due to the formation of a $Cr_2O_3$ layer that passivates the surface. There also may be an ability to tailor the sliding wear properties of $Cr_3C_2$—NiCr coatings, which opens the door to improvements in the damping characteristics through further processing. Moreover, the damping simulations point to the influence that architectural variability has on the interplay between frictional and inertial damping. Optimization of the underlying micro-architecture offers the opportunity to design 3D woven metallic lattice materials with increased and tunable damping properties. Combining mechanical damping with active cooling, flow regulation, and electrical conductivity would enable multi-functional materials for use in elevated temperature environments.

Figure 5:
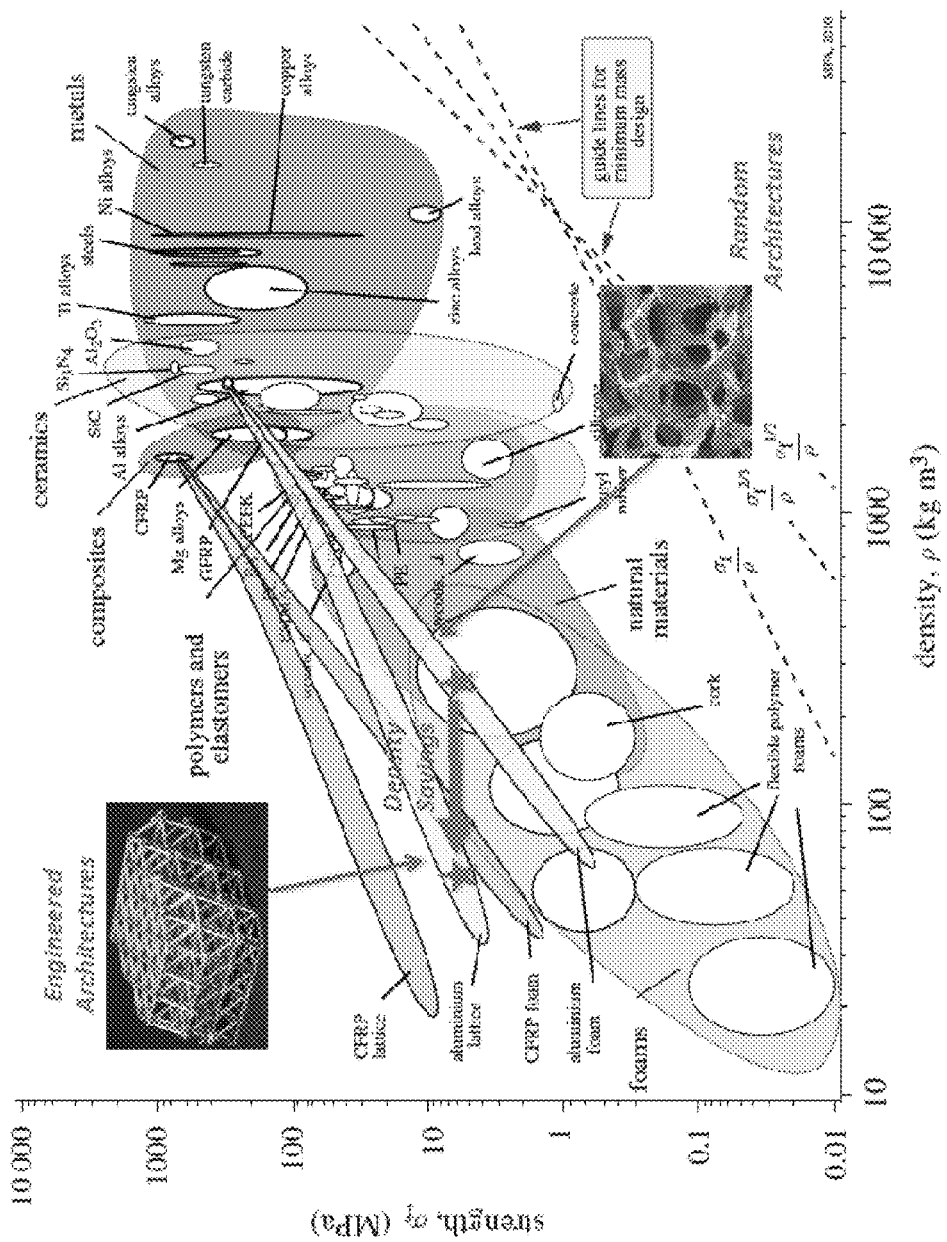
FIG. 5 illustrates a graphical view of an Ashby plot relating strength to density. Engineered architectures retain strength more efficiently than stochastic foams.

Optimizing material properties by iterating through a series of experiments—fabricate, characterize, test, and repeat—is arduous and expensive, inhibiting rapid discovery of novel material systems. Yet such iteration is still very common in part because the development of novel material processing technologies has thus far outpaced the development of material design methodologies. Manufacturers now have the ability to control material structure, or architecture, at the sub-millimeter scale. Case studies have shown that such control enables fabrication of materials with engineered, ordered architectures that provide impressive combinations of material properties that cannot be realized by solid materials or foams with stochastic pore architectures, as illustrated in FIG. 5. FIG. 5 illustrates a graphical view of an Ashby plot relating strength to density. Engineered architectures retain strength more efficiently than stochastic foams. Micro-truss architectures, including Kagome, tetrahedral, and pyramidal lattices, in particular are generating significant interest as the core material in sandwich structures. They offer low density and have demonstrated improvements in specific stiffness, strength and blast resistance.

Figure 6:
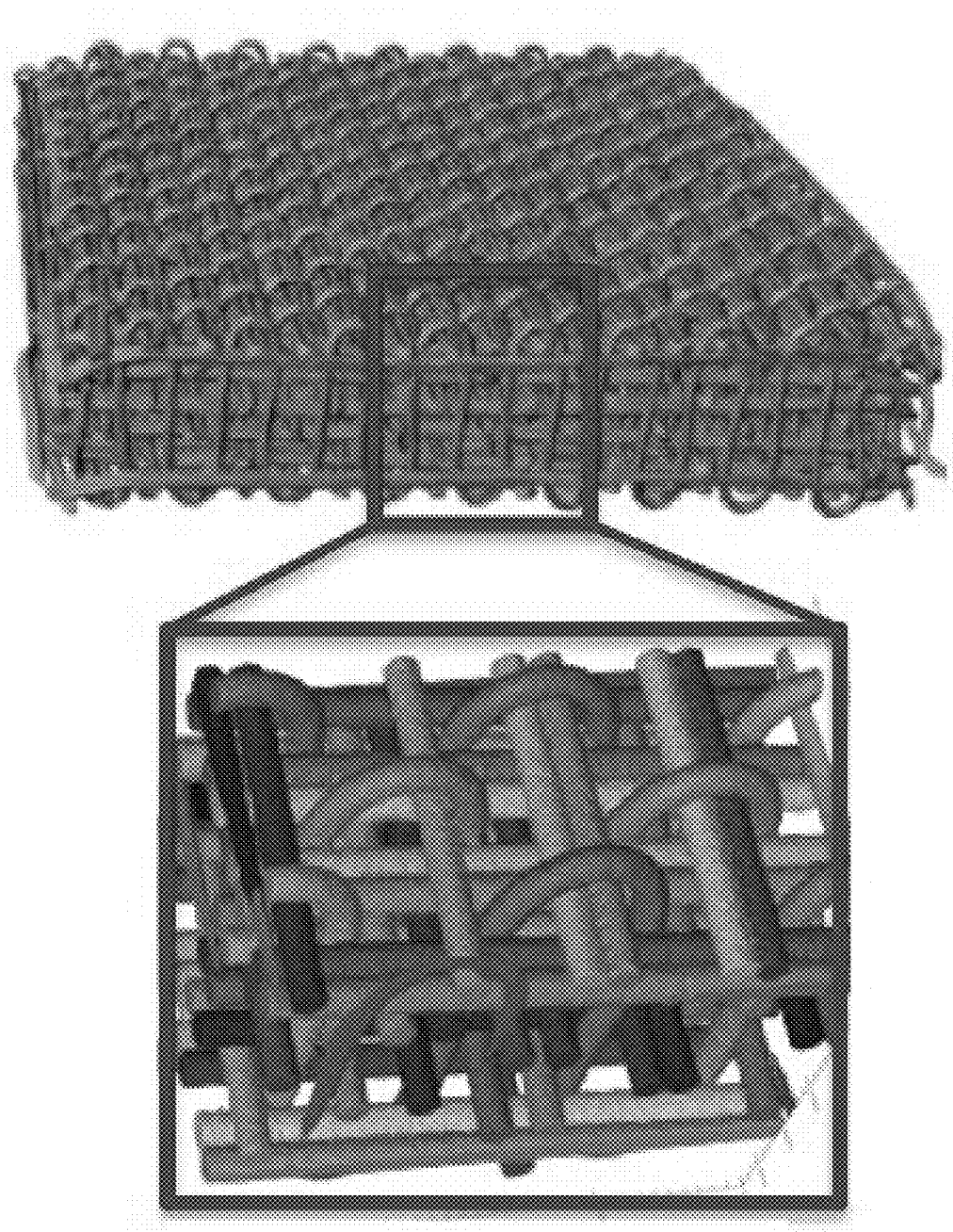
FIG. 6 illustrates a perspective and microscope view of 3D woven lattice exhibiting a periodic architecture of 202 micron wires that can be designed and optimized to tailor attendant properties, e.g. damping and stiffness.

While several fabrication methodologies such as 3D printing and other additive manufacturing processes exist for creating micro-truss structures like the one shown in FIG. 5, scaling them to high throughput manufacturing can be a challenge. Modern 3D weaving technologies, on the other hand, are highly scalable while offering the capability to maintain manufacturing precision. It is possible to fabricate kilogram quantities of porous woven lattices using 160 to 200-micron diameter metallic wires. The architecture of these lattices, as illustrated in FIG. 6, has been designed using topology optimization to decouple and tailor specific properties, e.g. maximizing fluid permeability while minimizing loss in shear stiffness. FIG. 6 illustrates a perspective and microscope view of 3D woven lattice exhibiting a periodic architecture of 202 micron wires that can be designed and optimized to tailor attendant properties, e.g. damping and stiffness. Experimental measurements confirmed that the woven materials, once bonded, exhibited exceptional combinations of shear stiffness and fluid permeability.

Figure 7:
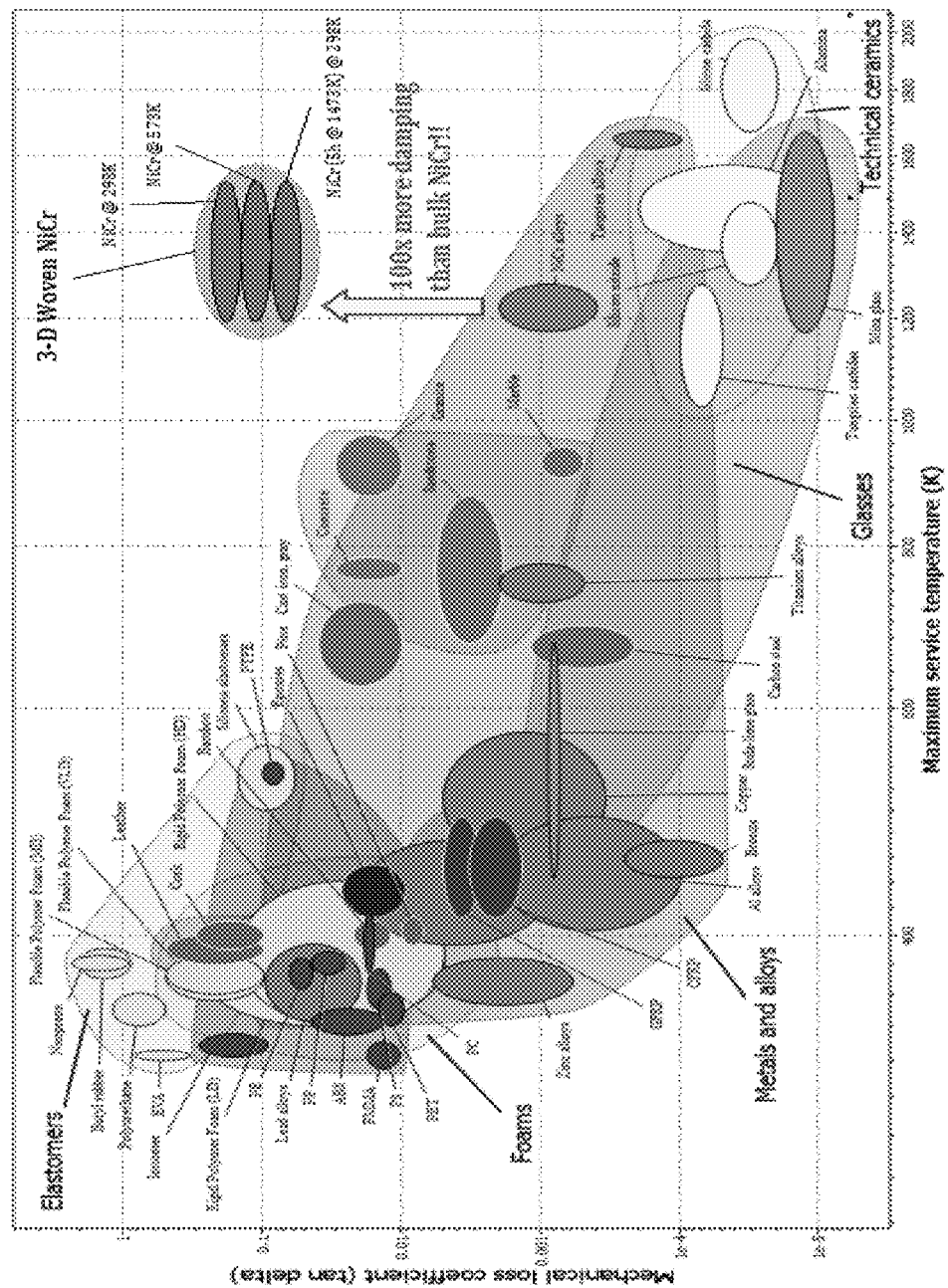
FIG. 7 illustrates a graphical view of an Ashby plot of mechanical loss coefficient (tan delta) vs. max service temperature (K). Preliminary measurements show tremendous potential of NiCr woven lattices as high temperature damping materials.

When left un-bonded, the 3D woven lattices were found to exhibit remarkable damping properties. FIG. 7 displays an Ashby plot comparing mechanical loss coefficients to operating service temperatures for a wide range of materials. Experimentally measured loss coefficients for 3D woven lattices fabricated using NiCr wire are shown in the "white space" in the upper right of this plot, well beyond the property range of existing bulk materials. FIG. 7 illustrates a graphical view of an Ashby plot of mechanical loss coefficient (tan delta) vs. max service temperature (K). Preliminary measurements show tremendous potential of NiCr woven lattices as high temperature damping materials. Although the observed loss coefficients decreased when the samples were subjected to heat treatment, these NiCr weaves were measured to have damping coefficients on the order of 100 times larger than bulk NiCr, and offer service at temperatures nearly double (+600 K) that of materials with comparable damping properties. Detailed modeling to date has revealed two primary damping mechanisms, frictional and inertial, that can be readily optimized, in addition to internal material damping of the wire or yarn base material.

The centerpiece of the design framework is topology optimization, a systematic, free-form approach to the design of material structures. Topology optimization poses the design problem formally as an optimization problem with governing mechanics and fabrication restrictions represented explicitly (or implicitly) as constraints. Sensitivity analysis then informs design decisions, ultimately identifying the optimized material resource distribution across the design domain, including material type and connectivity (architecture). The key feature is that the mechanics, including unit cell mechanics and upscaling relations, are tightly coupled to formal mathematical programming. This provides a systematic, rigorous alternative to traditional ad hoc, experience-driven design approaches.

In the long term, the opportunity is to optimize design through three length scales: (i) the component/structure spanning centimeters to meters, (ii) the unit cell spanning hundreds of microns to cm, and (iii) the wire microstructure within the unit cell spanning nanometers to tens of microns. The highest level encompasses component topology and gradients in unit cell architecture, porosity, and composition. The second level (unit cells) employs topology optimization to design the architecture of the woven lattice. Available degrees of freedom include the volume fraction, cross-section, and connectivity of wires or yarns in each of three directions. The physical limits of the weaving processes are incorporated into the optimization procedure at this scale; nevertheless the use of unit cell architectures will allow us to decouple properties and to grade properties across the component. The smallest hierarchical level (wire shape and microstructure) focuses on coating and bonding of the base wires (i.e. NiCr and stainless steel) to enhance friction, stiffness, and mass. Although the long term vision is an integrated design framework across all three scales, the scope of this proposal excludes design at the highest (component) level.

Figure 19:
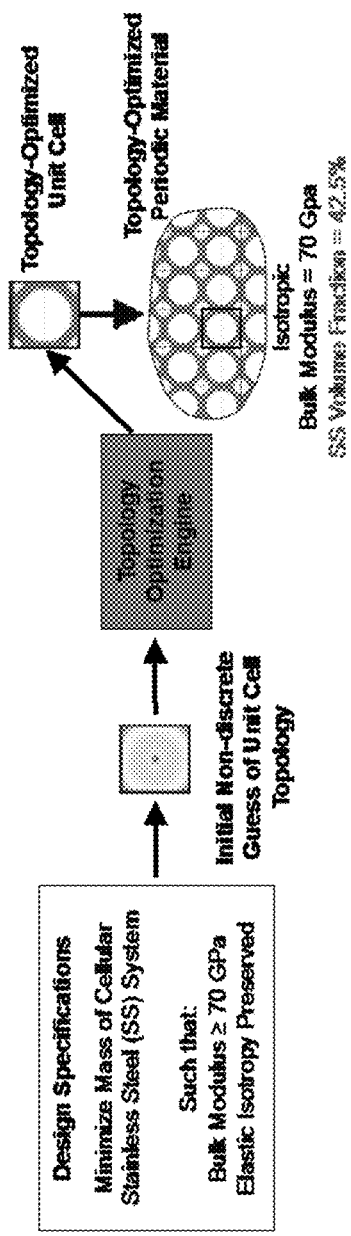
FIG. 19 illustrates a schematic diagram of a general topology optimization design strategy. The color of each finite element indicates material concentration, with dark being 100% ($\rho^e=1$, solid) and light being 0% ($\rho^e=0$, void). Note the final solution achieves the upper Hashin-Shtrikman theoretical bound on bulk modulus.

Although fundamentally a binary programming problem, the large dimensionality of the design space (typically $>10^4$ design variables) gives strong preference for gradient-based optimizers. The discrete condition on $\rho^e$ is therefore relaxed by allowing mixtures of materials in each finite element. Such mixtures are penalized (e.g., using the SIMP method), making the problem continuous with a strong preference for binary solutions. This is illustrated schematically in FIG. 19 where the design goal is to minimize mass of an isotropic porous material while satisfying a minimum stiffness requirement (bulk modulus). FIG. 19 illustrates a schematic diagram of a general topology optimization design strategy. The color of each finite element indicates material concentration, with dark being 100% ($\rho^e=1$, solid) and light being 0% ($\rho^e=0$, void). Note the final solution achieves the upper Hashin-Shtrikman theoretical bound on bulk modulus. The initial design is non-descript, containing a mixture of material at all locations. The resulting design, in contrast, is two-phase (solid-void) and predicted to achieve the upper Hashin-Shtrikman theoretical bound on bulk modulus.

Topology optimization is a feature of the design framework of the present invention. The goal, put simply, is to identify the material composition at every point within the design domain, which is the unit cell of the periodic material. The domain is discretized with finite elements and the design is encoded in a binary material distribution function denoted as ρ, where, for porous materials, ρ=1 indicates the presence of material within the element e and $\rho^e=0$ indicates a void. Unlike sizing and shape optimization, material can then be placed or removed at any location (in any finite element) within the design domain by simply changing the magnitude of $\rho^e$. Material architecture thus evolves in a free-from manner during the optimization process.

The key feature of topology optimization is that the design problem is posed formally as an optimization problem, and thus design decisions are guided by coupling the governing mechanics with multi-objective mathematical programming, thereby eliminating the ad hoc trial-and-error aspect of traditional materials design. Sensitivity (gradient) information guides the optimization and is readily available through the adjoint method or direct differentiation of the governing unit cell and upscaling equations.

Figure 8:
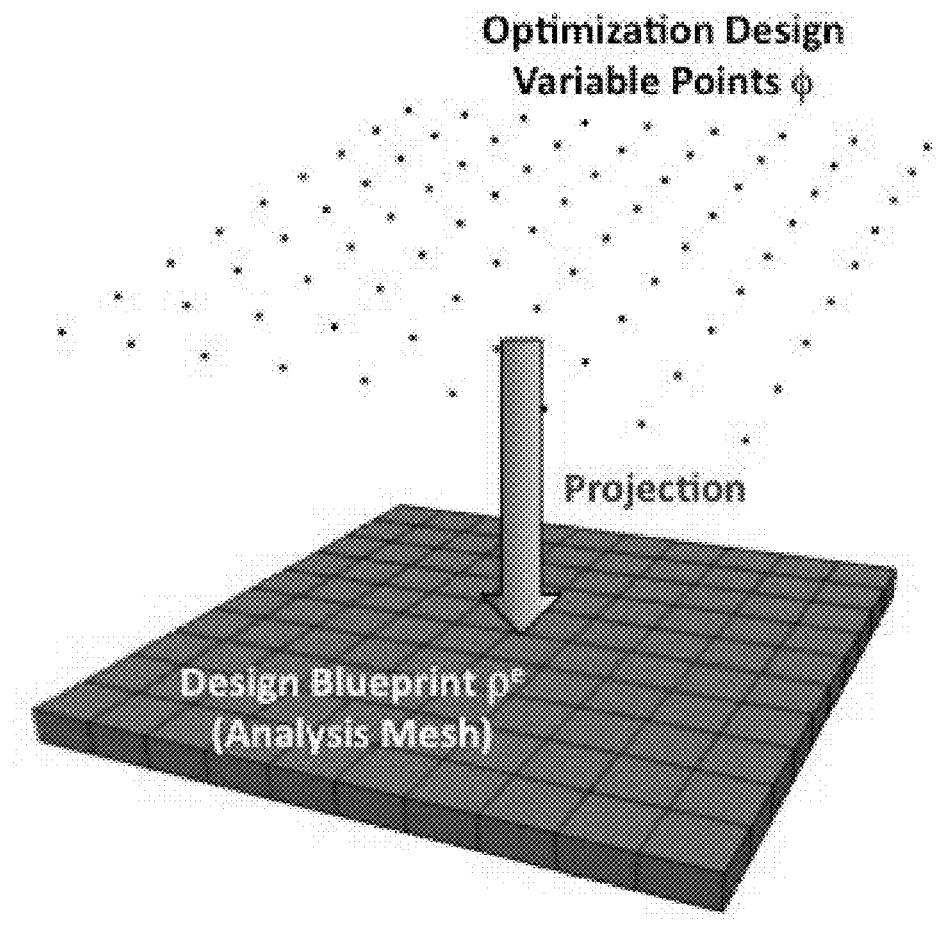
FIG. 8 illustrates a schematic diagram of independent design variables $\phi$ projected onto the finite element domain $\rho^e$ in the shape and at the length scale resolution of the manufacturing tool.

The primary disadvantage of the design freedom inherent in topology optimization is that solutions may be complex and quite challenging, or even impossible, to manufacture. This has been one of the major obstacles in bringing topology optimization to industry and has motivated development of a class of topology optimization algorithms know as Heaviside Projection Methods (HPM). These methods work by computationally projecting material from an auxiliary independent design variable field φ onto the physical (and finite element) domain $\rho^e$ in a manner that mimics the manufacturing process, as illustrated in FIG. 8; that is, at the length scale and in the shape of the fabrication tool. FIG. 8 illustrates a schematic diagram of Independent design variables φ are projected onto the finite element domain $\rho^e$ in the shape and at the length scale resolution of the manufacturing tool. This is the key idea, as it ensures designs can be built, and further that they are optimized for the chosen manufacturing process.

Figure 9:
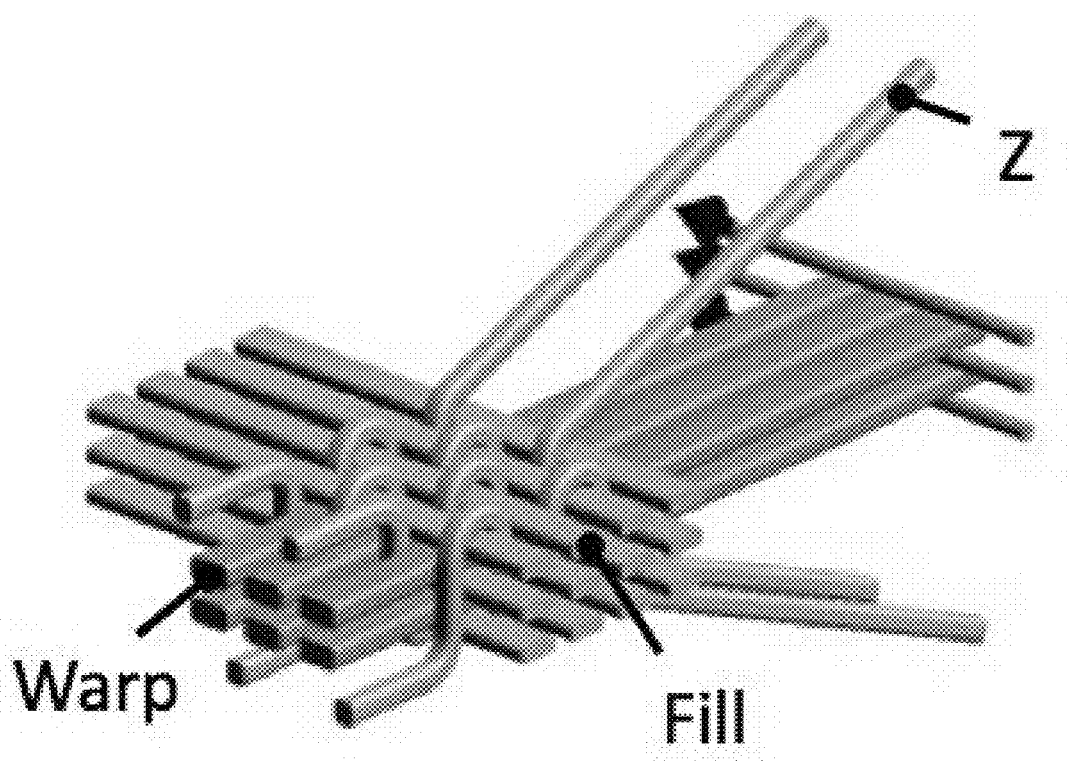
FIG. 9 illustrates a schematic diagram of the 3D weaving process according to an embodiment of the present invention.

The textile industry is based on low cost, mass production of materials through the intricate 2D weaving of very fine fibers. Expansion to 3D weaving allows for the fabrication of specially designed structural materials. Although it has been widely used for inexpensive, rapid production of composite preforms with yarns of carbon or glass fibers, here weaving fine metallic or ceramic wires or yarns to create tunable, porous unit cell architectures is the focus. FIG. 9 displays the general 3D weaving concept. The warp (longitudinal) and fill (transverse) wires are kept straight (no crimp) as the figure shows, while the Z-wires travel through the thickness of the weave and wrap the fabric, creating an interlocked system. In composites, this interlocking feature has been shown to enhance damage tolerance, delamination suppression, and resistance to impact.

It is worth noting that the 3D weaving approach used here, as illustrated in FIG. 9, is an alternative to through-the-thickness stitching approaches where 2D woven fabrics are stacked and then are stitched together by forcing a yarn through the stack. This stitching approach tends to damage the fabric during stitching, giving preference to the 3D weaving, where wires are woven in all three dimensions simultaneously. 3D weaving is also substantially different than Kagome lattices and materials using helical wire architectures, such as the wire-woven bulk cross. Such material systems have extremely low densities and, in the case of helical wire patterns, offer relatively low stiffness.

Although the schematic in FIG. 9 shows only five layers (3 fill and 2 warp layers), another key advantage of using the 3D weaving manufacturing process is scalability. There is no theoretical limitation to the number of layers in the weave, which is related to thickness of the manufactured material system, nor the width or length of the material pallet that can be manufactured. Each wire or yarn simply requires a feeder spool and an insertion reed to properly position the wire or yarn during weaving. As the diameter of the spool is larger than the diameter of the wire, the wire storage apparatus is typically much larger than the volume of the manufactured sample, which is the primary practical limitation.

Although the requirement of having three planes of mutually orthogonal wires or yarns seems restrictive from a design freedom point of view, another great advantage of the 3D weaving process is that each wire or yarn in the lattice can be a different material, shape (e.g., a solid wire or tube), and/or size, as each is stored on its own spool; further, multiple wires can be inserted at each reed location. The architecture also need not be dense, as suggested in FIG. 9, but rather one can skip insertions of different wires to created significantly varying architectures with tailored pore structures, as shown in FIG. 6. Of course this is not unconstrained, as removing several adjacent wires would cause layers above to sag and potentially collapse during manufacturing. Finally, it is noted that post-processing treatments can further tune wire or yarn chemistry, mass, stiffness, location (fugitive wires) and surface roughness. The design space is thus surprising rich, and motivates the use of topology optimization to enable systematic navigation of design options.

Figures 10A, 10B, 10C:
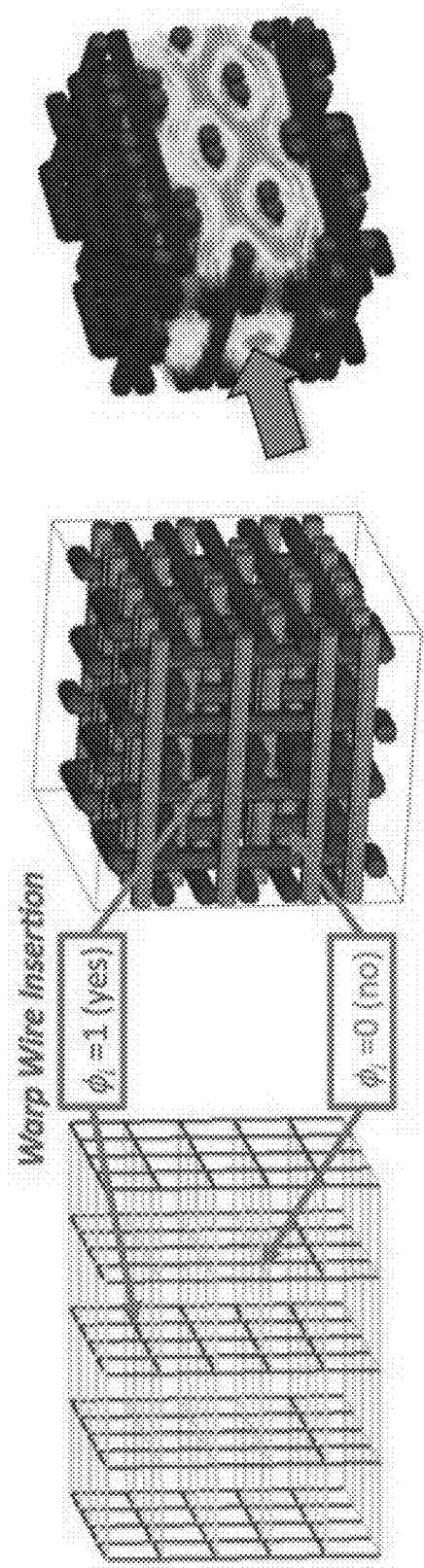
FIGS. 10A-10C illustrate a ground structure approach to topology optimization of 3D woven lattices.

Much like in the topology optimization of truss structures, the idea is to discretize the design domain with line elements and essentially determine whether each element exists or is removed in the final optimized architecture. In the context of 3D weaving, these line elements represent the location of insertion reeds and thus the centroid location of inserted wire pairs in the warp and fill direction, and centroid location of single wires in the Z-direction. When a line element (reed) design variable indicates an insertion should occur (φ=1), material is projected about the line element centroid onto continuum finite element space $\rho^e$ to create the wire features as shown in FIGS. 10A and 10B. Although lattices structures seem to lend themselves to using beam finite elements, continuum elements were used here to model the fluid flow through the porous lattice, while simultaneously capturing the intricate bond geometry for the stiffness and strength modeling, as described herein. FIGS. 10A-10C illustrate a ground structure approach to topology optimization of 3D woven lattices. FIG. 10A: Unit cell design element mesh underlying the optimized solution: the lines indicate that warp, fill, and Z-wires are to be projected (φ=1), respectively, and grey lines indicate no wire projection occurs (φ=0); FIG. 10B: the continuum representation $\rho^e$ of (a) following the projection operation; and FIG. 10C a cutaway view showing streamlines associated with flow in the warp direction.

FIG. 10C displays the topology-optimized solution when maximizing a combination of warp-direction permeability and shear modulus defined in the warp-fill plane. An explicit constraint limiting the number of adjacent insertion locations that could be skipped was also enforced to ensure manufacturability of the woven lattice. The solution shows that the optimizer skipped every other insertion of warp and fill wires in all interior layers, but did so in an aligned pattern in the warp direction and a staggered pattern in the fill direction. Although perhaps not intuitive, as the result is winding flow channels, further investigation revealed that the staggered pattern of the fill wires created channels of larger diameter than if the fill wires were aligned. Comparing the optimized solution to the standard architecture, permeability increased 400% while specific shear modulus decreased 20%. These magnitudes can be further improved by increasing the allowable distance between insertions.

Figures 11A, 11B, 11C, 11D, 11E:
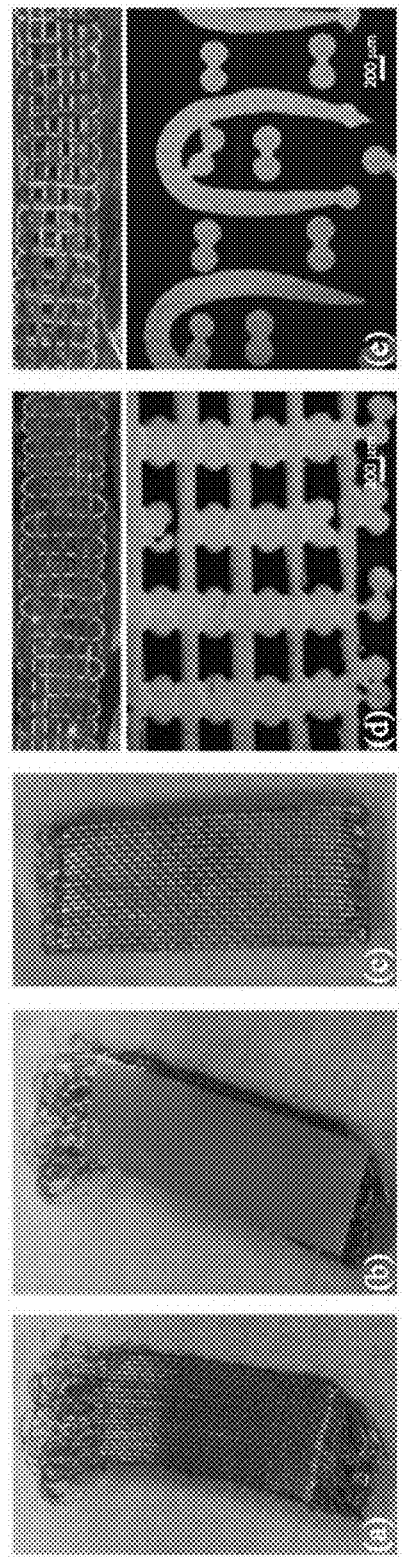
FIGS. 11A-11E illustrate bonding of Cu 3D woven lattices.

Following fabrication, the 3D woven lattices are relatively compliant when subjected to compression, bending, or shear. These lattices can be made rigid by bonding the wires at their contact points, for example, by using braze. FIGS. 11A-11E illustrate this idea for Cu lattices. FIGS. 11A-11E illustrate bonding of Cu 3D woven lattices: FIG. 11A: sample as fabricated, FIG. 11B: thin sheet of braze on 3.4 cm×1.3 cm surface, FIG. 11C surface after heating and bonding, FIG. 11D fill-z cross-section of standard architecture showing bonded wire junctions, FIG. 11E fill-z cross-section of optimized architecture showing bonded wires. Wires are 202 micron in diameter. A thin sheet of braze is placed on top of a woven lattice sample and is heated at 900° C. for 5 minutes. The braze melts at this temperature and wicks into the weave through capillary action, filling in the small wire junctions without clogging the larger pore channels that were designed by topology optimization when maximizing permeability. This process is remarkably conformal, robust and effective. The same brazing process has also been applied to the NiCr weaves, although a moderate degree of bonding can also be achieved with solid-state pack aluminization of NiCr lattices.

Figure 12:
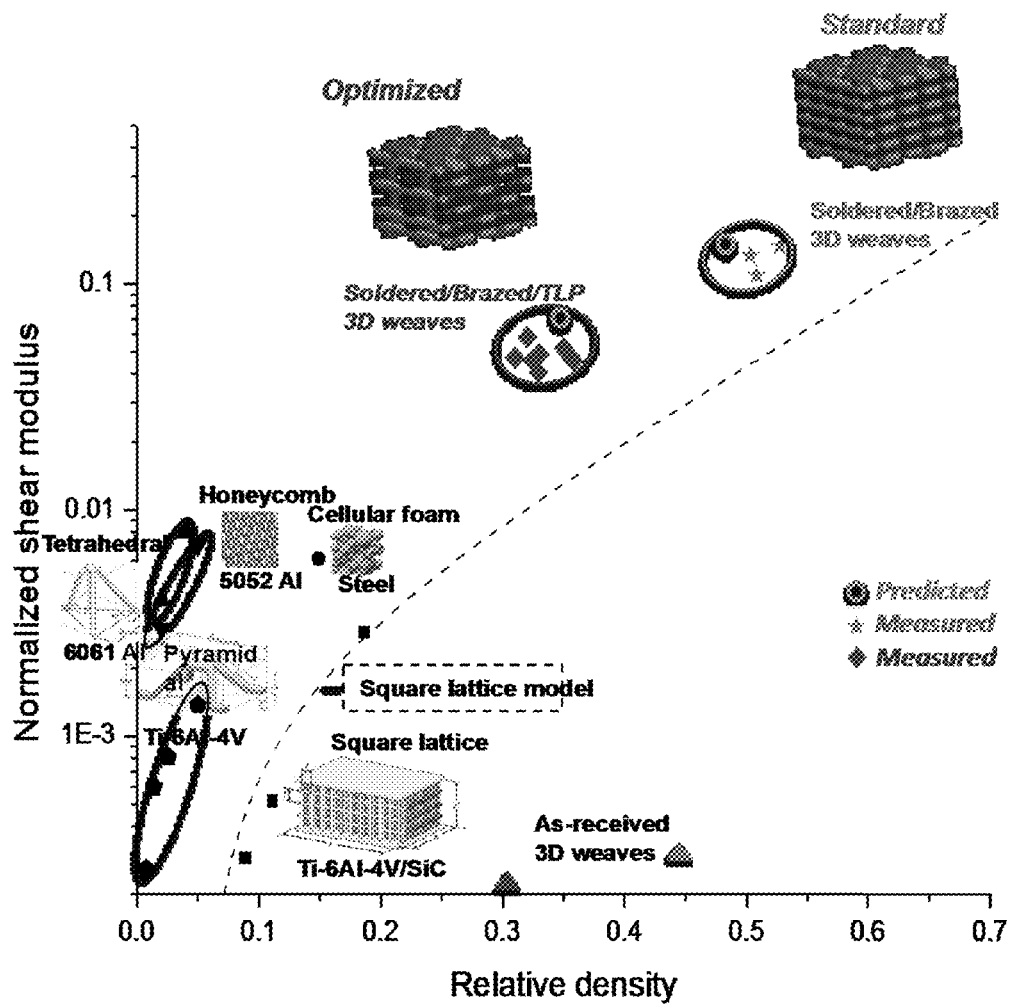
FIG. 12 illustrates a graphical view of normalized shear stiffness of bonded 3D woven lattices and other well-known architected material systems.

As one would expect, the bonding of these 3D woven lattices leads to dramatic improvements in stiffness. FIG. 12 shows the shear modulus of the brazed Cu lattices along with published data for the pyramidal lattice, square lattice, tetrahedral lattice, honeycomb truss, and a steel hollow sphere foam, all normalized by the stiffness of the base material from which they were fabricated. FIG. 12 illustrates a graphical view of normalized shear stiffness of bonded 3D woven lattices and other well-known architected material systems. While it is quite clear the measured stiffnesses of the 3D woven lattices are well above existing lattice systems, which tend to have much smaller volume fractions, it is interesting to note they also offer significantly larger stiffness than the approximate analytical models for shear modulus for pyramidal and square lattice trusses, shown as the dashed line extended to larger relative densities. Although the square lattice architecture may appear similar to the 3D woven architectures considered herein, it is created through a stacking of two-dimensional grids and thus lacks the Z-wire, the interlocking wire of the 3D woven lattice, which is critical to shear stiffness.

Figures 13A, 13B, 13C, 13D:
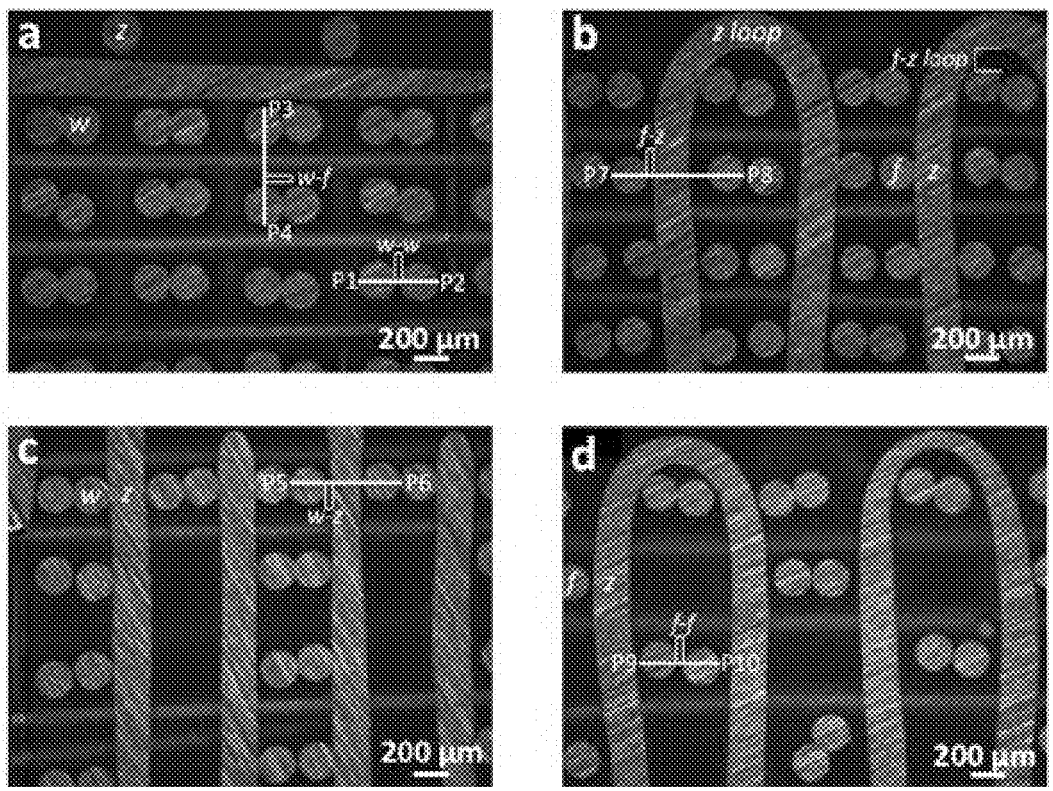
FIGS. 13A-13D illustrate typical optical cross-sections of Cu lattices after weaving but prior to bonding.
Figure 13E:
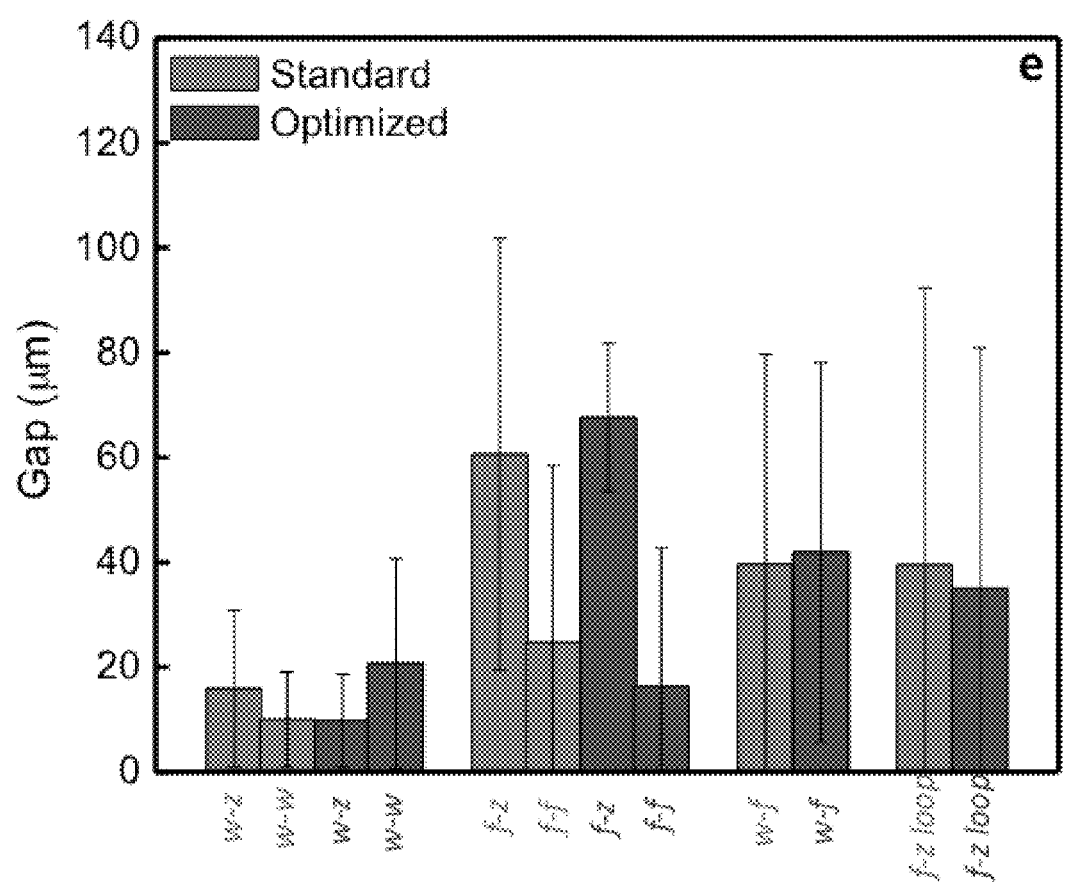
FIG. 13E illustrates average gaps between particular wire pairs, where w, f and Z refer to warp, fill and Z wires within the weaves.

While the 3D weaving process offers control of wire position, size and chemistry, manufacturing imperfections do exist; wires can twist and unintended inter-wire gaps can appear as shown in FIGS. 13A-13E. These gaps are most obvious between the Z wires and the fill wires for both the standard and optimized weaves (FIGS. 13B, 13D). To effectively predict weave properties the lattice architectures were characterized using 2D optical cross-sections and quantified averages and distributions for the un-intended inter-wire gaps as shown in FIG. 13E. FIGS. 13A-13D illustrate typical optical cross-sections of Cu lattices after weaving but prior to bonding. FIG. 13E illustrates average gaps between particular wire pairs, where w, f and Z refer to warp, fill and Z wires within the weaves. Note that the two lattice architectures have very similar gap distributions, indicating that the removal of warp and fill wires for the optimized lattice did not lead to significant changes in gap spacing. The average gaps were then used to predict permeability and stiffness with FEM models. In the case of weave permeability, it was found that FEM predictions improved from 25% down to 5% discrepancy with experimental results when average wire gaps were used as inputs instead of the ideal (tangent) wire positions that were assumed in the design process. This emphasizes the need to incorporate manufacturing variability into the design formulation. In some cases X-ray tomography was also used to identify individual wire locations in small samples. While these studies produced even more effective predictions of weave permeability, the small sample size and longer turnaround times limited X-ray tomography to select samples.

Figure 14:
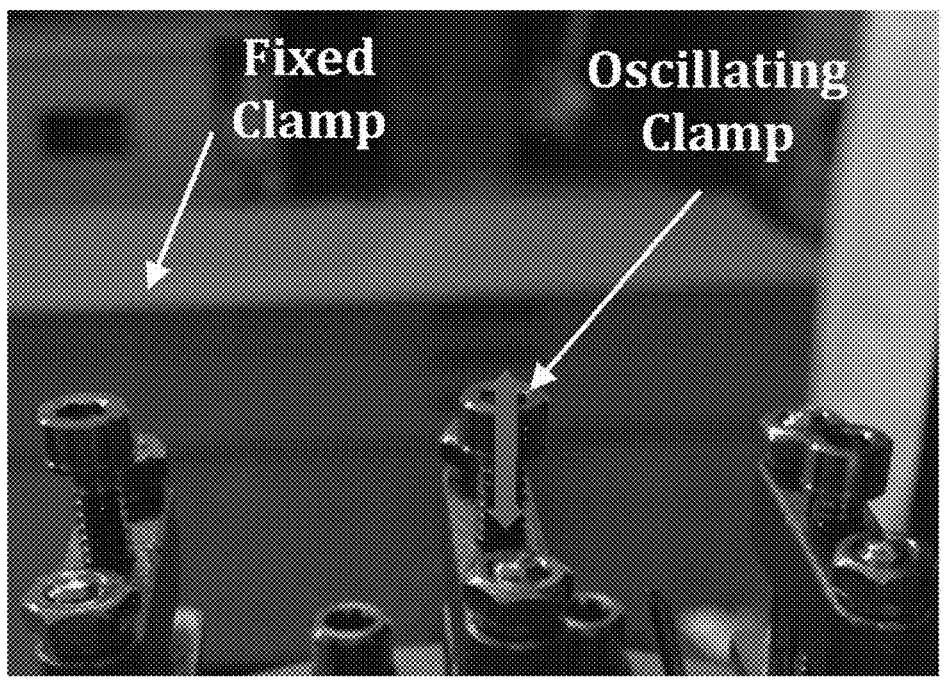
FIG. 14 illustrates damping experiments with the DMA and corresponding finite element model employing contact and friction.

As previously mentioned above and presented in FIG. 7, preliminary investigations were performed into the damping properties of the 3D woven lattices. Cu and NiCr lattices, having the standard and permeability-optimized architectures, as illustrated in FIGS. 10A-10C, were tested in bending using a TA Instruments Q800 Dynamic Mechanical Analyzer (DMA), as illustrated in FIG. 14 at frequencies varying from 1 to 200 Hz. FIG. 2 displays the measured loss coefficients and clearly shows that the 3D woven lattices exhibit significantly larger damping than a solid Cu plate, as well as other bulk metallic materials (FIG. 7). FIGS. 16A and 3 illustrate damping experiments with the DMA and corresponding finite element model employing contact and friction. FIG. 2 illustrates a graphical view of measured mechanical loss coefficients for different 3D woven lattices. Interestingly, however, these loss coefficients are degraded slightly when the woven lattices were subjected to elevated temperatures, as shown in FIG. 7. Preliminary results suggest this is an irreversible effect, with potential sources being annealing of the wires, oxidation, or relaxation of residual stresses. Nevertheless, the damping response of the thermally exposed lattices was greater than other metallic materials and on par with rubbers and polymers whose maximum use temperature typically does not extend much beyond room temperature.

In order to more fully explore the damping behavior of the 3D woven lattices a finite element model of the NiCr optimized architecture was created with length 17.5 mm and width 10 mm, matching the size of the DMA experimental samples, as illustrated in FIG. 3. All wires were explicitly represented and contact and friction were included. The model was then subjected to a sinusoidal load at 70 Hz and, at steady state, frictional energy dissipation and mechanical loss coefficient, calculated as the ratio of the loss modulus to the storage modulus, were computed.

As these woven lattices were un-bonded, Coulomb (frictional) damping was expected to be the dominant mechanism. Friction is known to be an excellent energy dissipating mechanism, and friction-based metallic wire mesh dampers have been implemented in a number of applications. For example, the high-pressure fuel turbo pump in the space shuttle utilized randomly oriented metallic meshes, General Electric has developed knitted meshes of copper wires for damping turbomachinery, and knitted mesh dampers are available commercially. Surprisingly, however, the finite element simulations revealed that energy dissipated through friction accounted for a relatively small portion of the computed loss coefficient in the woven lattices. Further investigation revealed a strong inertial damping effect created by wires vibrating locally at different frequencies than the global vibration of the sample. As inter-wire gaps were introduced into the model, this inertial damping mechanism appeared to increase, likely because wire lengths increased, changing the wire natural frequencies and resulting wire motions.

In particular: (i) mechanical loss coefficients of 3D woven lattices (not optimized for damping) were measured to be over 100 times larger than bulk NiCr, providing potential for creation of novel high temperature damping materials, as illustrated in FIG. 7; and (ii) modeling suggests the presence of both Coulomb and inertial damping mechanisms, providing two avenues in which to tune mechanical damping while enabling control of other mechanical properties, such as stiffness.

The purpose of the topology optimization framework of the present invention is to tailor the inertial and frictional damping mechanisms through design of the 3D woven unit cell architecture. The excitation frequencies to be damped will ultimately be dictated by the application, but herein both low (<200 Hz) and high (>1 kHz) frequencies are investigated.

Figure 15A:
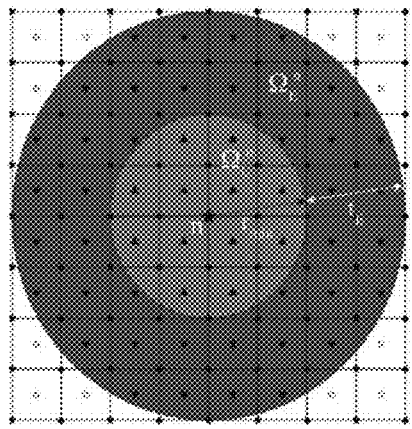
FIGS. 15A-15C illustrate optimizing the layout of discrete objects (inclusions) in a compliant matrix material using DOP.
Figure 15B:
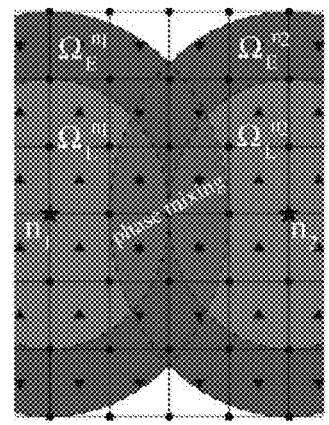
Figure 15C:
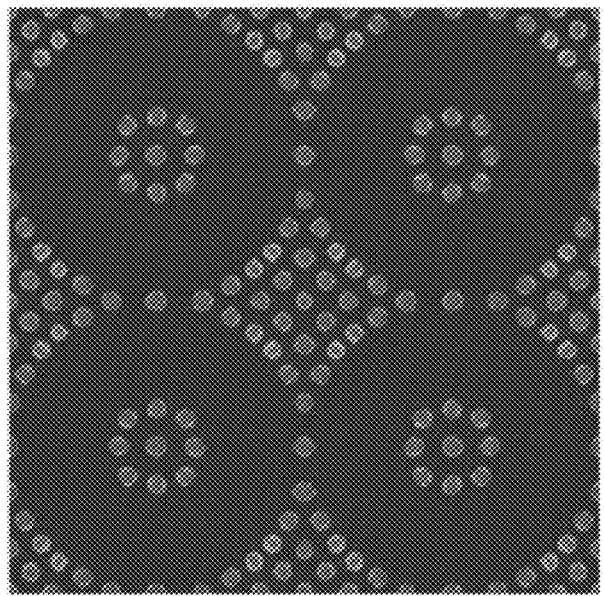

While the 3D weaving ground structure approach described herein has proven effective for the optimized design of readily manufactured topologies, it requires the potential wire sizes and number of wires per insertion to be defined a priori (e.g., two wires for each warp and fill insertion, as illustrated in FIGS. 10A-10C). A much more powerful approach is to allow the optimizer to make these decisions. To achieve this, a recently developed concept known as Discrete Object Projection (DOP) is used that has arisen out of the HPM logic. The idea is that when a design variable indicates a manufacturing action should occur, a circular object is placed at the location of i and is enclosed in a compliant shell, as illustrated in FIG. 15A. As in standard HPM, the independent design variable projections are then assembled in finite element space to form topology. However, if the optimizer places objects in close proximity, the compliant shell overlaps the inclusion feature, as illustrated in FIG. 15B, creating an effect termed phase mixing. This effect is penalized in the projection assembly routine by manipulating the governing constitutive relations in regions of phase mixing, driving the optimizer to select object layouts that do not overlap. This approach has been shown to effectively optimize the layout of stiff inclusions in a compliant matrix (FIG. 15C), while simultaneously providing the designer the ability to restrict object shape, size (minimum and maximum length scale), and spacing as desired. As in traditional free-form topology optimization, any number of objects may be placed, removed, or translate across the design domain, with formal sensitivity analysis guiding the design steps. FIGS. 15A-15C illustrate optimizing the layout of discrete objects (inclusions) in a compliant matrix material using DOP: FIG. 15A illustrates the projected object. FIG. 15B illustrates phase mixing occurs when objects become too close, requiring penalization. FIG. 15C illustrates optimized layout of stiff inclusions in periodic material for maximized isotropic bulk modulus. This approach is extended here to prevent overlapping wires or yarns in 3D woven lattices.

The methodology is extended here to enable a more free-from topology optimization approach to designing 3D woven architectures. The enclosure shells, shown in FIGS. 15A-15C, are made significantly smaller to enable close-packing of the wires or yarns as desired. To respect the non-crimp nature of the weaves, the design variable fields are located on the faces of the 3D unit cell only, and the 2D projection domains of FIG. 15A are extended to straight, 3D cylinders. This is has similarities to the idea in FIGS. 10A-10C, where a single design variable point creates a wire or yarn feature. However, the design variable field on the unit cell surface here is much higher dimension to enable a large number of candidate insertion points and variable size wires or yarns. The continuum representation in FIGS. 15A-15C is extended to include frame elements (e.g., as in FIG. 3), and wire overlapping, including wires of similar orientation (warp-warp) and orthogonal orientation (warp-fill, warp-z, fill-z), are prevented through penalization of phase mixing as in the continuum case.

This subtask will focus on tailoring inertial damping, which essentially is to optimize a system of tuned mass dampers (TMD) throughout the 3D woven lattice. The idea, put simply, is to tailor the natural frequencies of the free spans of the individual wires or yarns composing the woven lattice such that they resonate out of phase with the motion of the structural component when dynamically excited at a specified frequency. By vibrating out of phase, the wires or yarns provide countering inertial forces to the motion of the component, similar in concept to the fundamental mass-spring systems of Frahm for reducing (component) dynamic motion. Such a system could potentially be approximated via a sparse (low volume fraction), fully bonded woven lattice, such that resonant wire or yarn motions do not lead to contact or relative sliding between wires or yarns. Utilizing friction, air damping, and/or materials with large internal damping, in contrast, provides an energy absorbing mechanism leading to true tuned mass damper system.

Topology optimization is used to tailor the natural (resonant) frequencies of the individual wire or yarn segments composing the 3D woven lattice so as to optimize out-of-phase motion. By wire or yarn segments, it is meant that the free span between bonded junctions of an individual warp, fill or Z-wire. By designing this free span, through architecture (removal of supporting wires) and/or bonding at select wire or yarn junctions, the length and therefore stiffness and natural frequency of a wire or yarn 'beam' segment can be controlled. Additional options for tailoring natural frequency of wire segments include through wire material selection, or through coatings that may alter the wire mass and/or the bending stiffness.

Existing topology optimization approaches are leveraged for tailoring natural frequencies of structures and materials. These approaches are coupled with the 3D weaving projection methods to optimize wire locations, first using the ground structure approach, followed by the more powerful discrete object projection approach proposed herein. Topology optimization considering selective bonding will then be considered by combining these projection approaches with a recently developed algorithm for optimizing the location of rigid and pin connections in tall building topologies. Wire or yarn stiffness (modulus) and mass can likewise be readily optimized using existing material interpolation approaches and/or multi-material topology optimization. Full-scale computational modeling, including contact and friction as in FIG. 3, as well as experiments will then be used to evaluate the topology-optimized solutions. It should be noted that internal damping of the wire or yarn materials could also be considered in the material selection.

As discussed herein and illustrated in FIG. 14 and FIGS. 2 and 3, estimating energy dissipation through friction, or Coulomb damping, is a computational challenging and expensive task. It requires nonlinear dynamic modeling with contact detection. Realistically, it is unlikely to be able to impose a mathematically rigorous topology optimization algorithm to optimize these effects within the project scope. Therefore high fidelity models (FIG. 3) are used to develop parametric models relating energy dissipated to coefficient of friction and dynamic displacements of unbounded wire or yarn segments, which are the wires or yarns that undergo relative sliding. As displacements under dynamics loads can be readily optimized, this offers a viable avenue to tailoring frictional damping mechanisms.

Manufacturing variability in the form of twisting wires or unintended inter-wire (or yarn) gaps can significantly influence the fluid permeability and mechanical properties of 3D woven lattices. Although the magnitudes of these flaws have been reduced through improved processing, informed through feedback from optical characterization, such variabilities cannot be eliminated completely. Robust topology optimization algorithms are used to guide the design of lattices that are relatively insensitive to such manufacturing variabilities. Therefore efforts in this project are focused on characterizing these uncertainties and applying developed algorithms to the 3D woven lattices.

Following manufacturing but prior to bonding the lattices have limited stiffness and strength but superior damping properties. Once uniform bonding occurs stiffness and strength rise significantly but damping properties decrease. A variety of topology-optimized weaves have been produced. For example, they have demonstrated an ability to skip wire insertions and add fugitive braze wires while weaving. To date they have fabricated over 3 kgs of Cu and NiCr weaves that have been post-processed and characterized.

Figure 16:
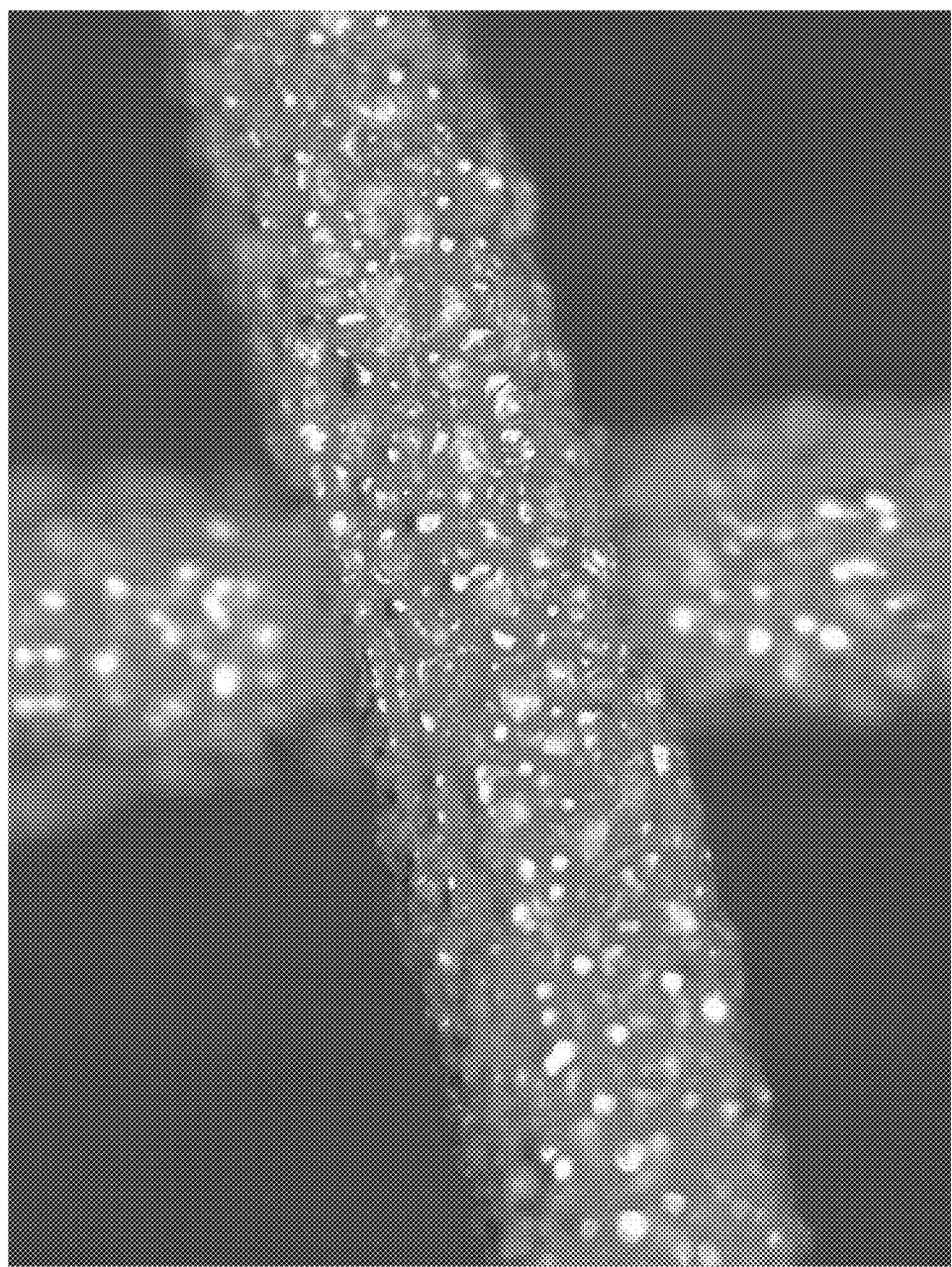
FIG. 16 illustrates Cu wires showing roughened surfaces following electrodeposition of Cu.

The friction coefficient of the NiCr wires are varied in a controlled manner to identify the role of friction in low and high temperature damping. Three processing routes are envisioned. The first approach is to roughen the surface of the wires using electrochemical deposition methods. FIG. 16 illustrates this approach and extending this methodology to NiCr wires and electrodeposition of Ni is straightforward. FIG. 16 illustrates Cu wires showing roughened surfaces following electrodeposition of Cu. Surface roughness can be varied by changing deposition time and deposition conditions, and the lattices can be deformed in a slow, cyclic manner during deposition to assure uniform coatings at the junctions between wires. Two alternative approaches are to oxidize the NiCr wire surfaces through exposure to air at high temperatures and to coat them with Al vapor to grow roughened intermetallic phases along their surfaces. While friction coefficients will typically be altered after fabrication of the weaves, if necessary, friction coefficients can be varied before weaving to insure uniform coatings and roughness along the wires. Ceramic wires or yarns can be coated using one of several vapor deposition methods, in particular chemical vapor deposition methods.

To quantify variations in friction coefficients with processing simple two wire experiments are performed. After plating, oxidation or intermetallic formation the force needed to pull one wire across another is measured with different normal loads applied. For such tests wires extracted from the lattices whenever possible is used. Additional tests will include measuring the force required to pull a single wire out of an un-bonded woven sample.

To alter the inertial effects within the lattices selective bond particular nodes are used within a given lattice as guided by the topology optimization. Braze materials (e.g. Cu—Ag) can be placed in particular locations within a lattice using small pieces of braze that flow down into the lattice upon heating or through the inclusion of braze wires. Both methods have been shown effective. The ability to localize the braze and hence the bonding is an open question that are addressed using different brazes and degrees of fluxing. To more selectively bond nodes wires such as stainless steel are strategically woven that are poorly wet by the chosen braze without fluxing. Incorporating different wires at different locations within the weave is straightforward, as discussed herein.

Figure 17:
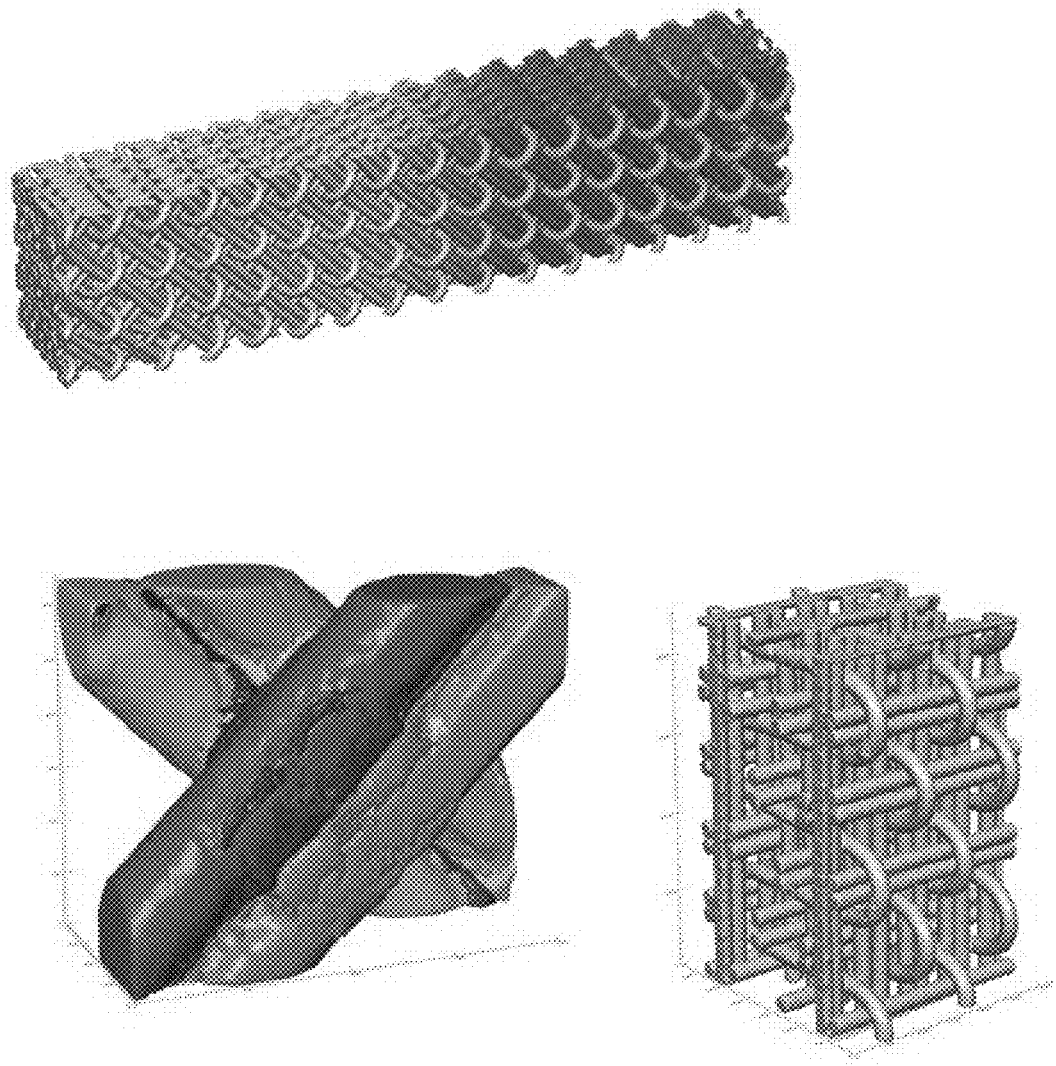
FIG. 17 illustrates 3D datasets of a Cu lattice (left) and brazed junction (middle) created by serial sectioning and a NiCr lattice (right) obtained with XCMT.

As shown in FIG. 7 idealized 3D woven lattices have wires oriented along mutually perpendicular axes and are tightly held together by crimped Z wires. However, as with any manufacturing process, defects can exist and these need to be identified. Thus, unintended gaps between wires, twisted or missing wires, other wire defects are identified and braze location using 2D and 3D methodologies. These measurements are especially important when making hybrid architectures with fugitive wires and/or selected bonding, and the ease of making 2D observations will allow for a rapid design-optimization-manufacturing-testing feedback cycle. For the 2D studies weaves are embedded in epoxy, cross-section, polish, and image optically for fast identification of wire locations. The 2D cross-sections in FIGS. 15A-15D demonstrate that the lack of tight Z wire crimping results in increased wire spacing and unintended gaps which in turn can facilitate wire (or yarn) sliding and vibrations in unbonded or partially bonded weaves. Thus, design and optimization of overall weave performance requires quantification of these gaps and the distribution of bonded nodes. It was found that simple 2D cross-sections of the weaves are often sufficient to capture the relevant statistics of wire (or yarn) locations and to build probabilistic models for geometric flaws and/or variability, 3D datasets, as shown in FIG. 17, offer more statistics regarding specific microstructural features such as braze location and geometry. FIG. 17 illustrates 3D datasets of a Cu lattice (left) and brazed junction (middle) created by serial sectioning and a NiCr lattice (right) obtained with XCMT. For cases where more extensive statistics on wire locations and bonding are needed, the material is ablated away in 10 μm steps using a femtosecond laser, image the surface, repeat the process over 100 times, and digitally stack the acquired images to create a 3D image of the weave as shown in FIG. 17. This effort will leverage a new laser ablation serial sectioning system being installed at JHU. 3D datasets of lattice materials will also be obtained by X-ray computed microtomography (XCMT) for a small number of cases (e.g., FIG. 17).

Figure 18:
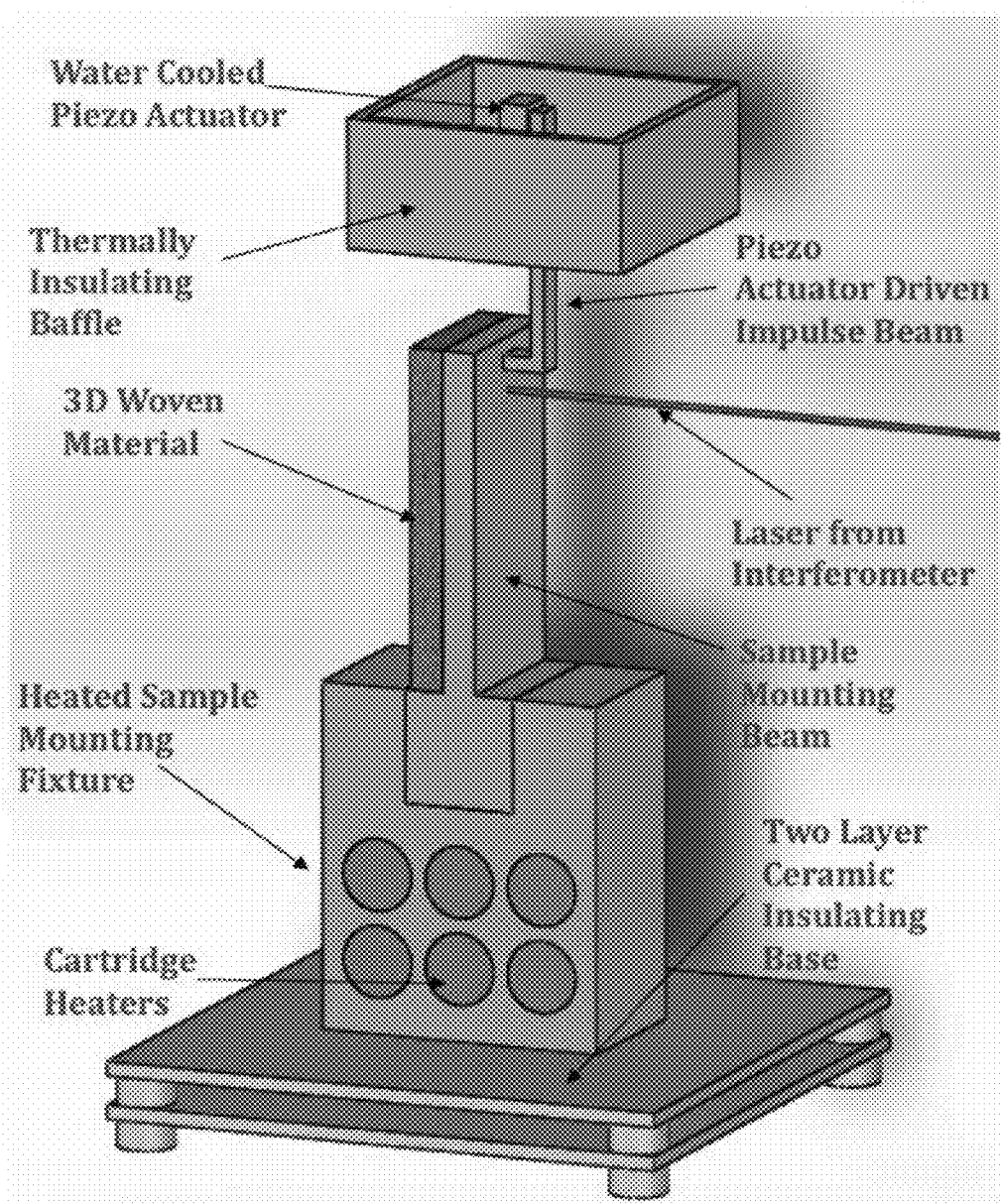
FIG. 18 illustrates a schematic of damping test system for dual beam setup. The testing will follow the procedures identified in ASTM E756-05, reaching maximum frequencies and temperatures of 5000 Hz and 500° C., respectively. Schematic is shown for measuring damping in bending. Damping in the axial direction are also considered.

The damping properties of 3D woven materials are measured using two different test systems. First, a TA Instruments Q800 DMA is used to measure woven samples in cantilever bending for frequencies up to 200 Hz. Additionally, measurements of loss factors for frequencies of 50 to 5,000 Hz are performed using a custom built system based on ASTM E756-05 and described schematically in FIG. 18. FIG. 18 illustrates a Schematic of damping test system for dual beam setup. The testing will follow the procedures identified in ASTM E756-05, reaching maximum frequencies and temperatures of 5000 Hz and 500° C., respectively. Self-supporting and non-self-supporting beams are tested at room temperature and elevated temperatures up to 500° C. The weaves are prepared for testing by brazing them to a thin support beam or by brazing them to a support block as a free-standing beam (not shown). In order to control the environment, the test fixture is contained inside a stainless steel chamber (not shown) capable of vacuum, argon, or air environments. A piezo electric transducer (isolated in a water cooled subchamber) will provide a sinusoidal or random input pulse and a laser-based interferometer will monitor the resulting displacements. Cartridge heaters will control the temperature of the beam and a low temperature pyrometer (not shown) are used to characterize weave temperatures. Calculations of the damping properties of the materials are performed by comparing the sinusoidal drive signals to the resulting displacements over a range of frequencies or by identifying the resonance frequencies following the random pulses using the half-power bandwidth method. Changes in relative wire positions are identified during testing using a high-speed (up to 80 kHz) optical camera and such information is compared with model predictions. Care is taken to identify the impact of elevated temperatures on the damping properties of the weaves by both testing at temperatures up to 500° C. and by annealing the weaves at even higher temperatures prior to testing.

It should be noted that computer programming can be used to apply topology optimization to the organization of the wires or yarns in the mesh as well as determining and modeling optimized damping. The computing device can be configured especially for manufacturing and optimizing the mesh, and it is possible that the computing device is directly coupled to a device for weaving the mesh in order to optimize the mesh in real time during manufacture.

A non-transitory computer readable medium that can be read and executed by any computing device can be used for implementation of the computer based aspects of the present invention. The non-transitory computer readable medium can take any suitable form known to one of skill in the art. The non-transitory computer readable medium is understood to be any article of manufacture readable by a computer. Such non-transitory computer readable media includes, but is not limited to, magnetic media, such as floppy disk, flexible disk, hard disk, reel-to-reel tape, cartridge tape, cassette tapes or cards, optical media such as CD-ROM, DVD, Blu-ray, writable compact discs, magneto-optical media in disc, tape, or card form, and paper media such as punch cards or paper tape. Alternately, the program for executing the method and algorithms of the present invention can reside on a remote server or other networked device. Any databases associated with the present invention can be housed on a central computing device, server(s), in cloud storage, or any other suitable means known to or conceivable by one of skill in the art. All of the information associated with the application is transmitted either wired or wirelessly over a network, via the internet, cellular telephone network, RFID, or any other suitable data transmission means known to or conceivable by one of skill in the art. A specialized and novel computing device that is configured to execute the method of the present invention is also included within the scope of the invention.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A device for providing damping comprising:
    wires woven to create a damping material for damping oscillatory forces;
    a predetermined lattice structure formed by the wires woven to create the damping material for damping oscillatory forces, such that the predetermined lattice structure is further configured to achieve a predetermined loss coefficient for the device;
    a predetermined pore structure formed by the wires woven to create the damping material for damping oscillatory forces, wherein the predetermined pore structure is also configured to contribute to the predetermined loss coefficient for the device;
    wherein the structure of the predetermined lattice structure and the structure of the predetermined pore structure are selected to enhance damping at high temperatures up to 1175° C.; and
    wherein positions of the wires in the damping material are selected to enhance damping at high temperatures up to 1175° C.

2. The device of claim 1 wherein the wires are formed from one selected from a group consisting of metal, ceramic, and polymer.

3. The device of claim 1 wherein the wires are formed from one selected from a group consisting of NiCr and Cu.

4. The device of claim 1 wherein the wires are formed from a combination of metals, ceramics, and/or polymers.

5. The device of claim 1 wherein the wires are formed from a silica, alumina, or carbon based material.

6. The device of claim 1 wherein the wires are woven in x, y, and z directions.

7. The device of claim 1 wherein the damping material is configured for damping due to at least one method selected from a group consisting of internal material damping, frictional energy dissipation (Coulomb damping), and inertial damping (tuned-mass damping).

8. The device of claim 1 wherein damping is achieved by modifying wire material chemistry.

9. The device of claim 1 wherein damping is achieved by modifying one selected from a group consisting of wire size and wire shape.

10. The device of claim 1 wherein damping is achieved by modifying wire coating.

11. The device of claim 1 wherein damping is achieved by modifying wire bonding.

12. The device of claim 1 wherein damping is achieved by modifying wire architecture.

13. The device of claim 1 further comprising the wires taking the form of a yarn.

14. The device of claim 1 wherein the positions of the wires to form the damping material are chosen by one selected from a group consisting of topology optimization, intuition motivated architectures, and mechanical-based design.

15. The device of claim 1 wherein the lattice structure and pore structure are configured for individual wires of the damping material to resonate out of phase with motion of a structural component when excited at a specified frequency, such that the wires provide countering inertial forces to the motion of the structural component.

16. The device of claim 15 wherein the device is configured to function for damping between frequencies of 50 Hz to 5,000 Hz.

17. A method for forming a damping material for damping oscillatory forces comprising:
    weaving wires in x, y, and z directions to form the damping material for damping oscillatory forces;
    forming a predetermined lattice structure with the weaving of the wires to provide damping at high temperatures up to 1175° C., such that the predetermined lattice structure is further configured to achieve a predetermined loss coefficient for the device;
    forming a predetermined pore structure with the weaving of the wires to provide damping at high temperatures up to 1175° C., such that the predetermined pore structure is further configured to achieve a predetermined loss coefficient for the device; and
    selecting positions of the wires to provide damping at high temperatures.

18. The method of claim 17 configuring the damping material for damping due to at least one method selected from a group consisting of internal material damping, frictional energy dissipation (Coulomb damping), and inertial damping (tuned-mass damping).

19. The method of claim 17 further comprising optimizing damping by modifying one selected from a group consisting of wire material chemistry, wire size, wire coating, wire shape, wire bonding, wire architecture.

20. The method of claim 17 further comprising selecting the position of the wires during manufacture in real-time.

21. The method of claim 17 further comprising using wires taking the form of yarns.

22. The method of claim 17 further comprising selecting the position of the wires by one selected from a group consisting of topology optimization, intuitive architecture, and mechanical-based design.

* * * * *